United States Patent
Hopson

(10) Patent No.: US 9,175,795 B2
(45) Date of Patent: Nov. 3, 2015

(54) COUPLING WITH LOCKING BARS

(75) Inventor: Douglas F. Hopson, Union City, PA (US)

(73) Assignee: Parker-Hannifin Corporation, Cleveland, OH (US)

( * ) Notice: Subject to any disclaimer, the term of this patent is extended or adjusted under 35 U.S.C. 154(b) by 0 days.

(21) Appl. No.: 13/482,945

(22) Filed: May 29, 2012

(65) Prior Publication Data
US 2013/0320673 A1   Dec. 5, 2013

(51) Int. Cl.
  *F16L 37/18* (2006.01)
  *F16L 37/42* (2006.01)
  *F16L 37/092* (2006.01)

(52) U.S. Cl.
  CPC .............. *F16L 37/42* (2013.01); *F16L 37/092* (2013.01); *Y10T 29/49826* (2015.01)

(58) Field of Classification Search
  CPC ..... F16L 37/138; F16L 37/086; F16L 37/142; F16L 37/146
  USPC .......................................... 285/315, 316, 317
  See application file for complete search history.

(56) References Cited

U.S. PATENT DOCUMENTS

| | | | |
|---|---|---|---|
| 2,092,116 A | 9/1937 | Hansen | |
| 2,279,146 A | 4/1942 | Schneller | |
| 2,344,740 A | 3/1944 | Shaff | |
| 2,433,119 A | 12/1947 | Hansen | |
| 3,133,755 A | 5/1964 | Sciuto | |
| 3,188,123 A | 6/1965 | Hansen | |
| 3,468,562 A | 9/1969 | Chow et al. | |
| 4,311,328 A | 1/1982 | Truchet | |
| 4,350,321 A | 9/1982 | Berg | |
| 4,951,977 A | 8/1990 | Shutt | |
| 5,005,877 A | 4/1991 | Hayman | |
| 5,312,084 A | 5/1994 | Weh | |
| 5,575,510 A | 11/1996 | Weh et al. | |
| 5,582,223 A | 12/1996 | Weh et al. | |
| 5,630,570 A | 5/1997 | Lacroix et al. | |
| 5,634,624 A | 6/1997 | Lacroix et al. | |
| 5,706,967 A | 1/1998 | Weh et al. | |
| 5,927,683 A | 7/1999 | Weh et al. | |
| 5,957,468 A | 9/1999 | Weh et al. | |
| 6,035,894 A | 3/2000 | Weh et al. | |
| 6,050,298 A | 4/2000 | Lacroix et al. | |

(Continued)

FOREIGN PATENT DOCUMENTS

| | | |
|---|---|---|
| CA | 2442806 A1 | 10/2002 |
| CA | 2483578 C | 9/2003 |

(Continued)

*Primary Examiner* — Aaron Dunwoody
(74) *Attorney, Agent, or Firm* — Renner, Otto, Boisselle & Sklar, LLP

(57) ABSTRACT

The female coupling half includes: a body, a plurality of locking bars, a spring, a locking ring, and, a cam. The body includes a plurality of grooves, an exterior, and an internal longitudinal bore. The cam, locking ring and locking bars are movable between first and second positions. The cam in the first position permits the locking ring in first position, urged by the spring, to force the locking bars to a first position in the grooves of the body and to extend the locking bars into the internal longitudinal bore locking the male and females coupling halves. The cam in the second position engages and forcefully urges the locking bars to a second position in the grooves toward the exterior of the body and the locking bars urge the locking ring to a second position further compressing the spring.

48 Claims, 28 Drawing Sheets

(56) References Cited

U.S. PATENT DOCUMENTS

| | | | |
|---|---|---|---|
| 6,073,971 | A | 6/2000 | Weh et al. |
| 6,099,044 | A | 8/2000 | Weh et al. |
| 6,264,245 | B1 | 7/2001 | Weh et al. |
| 6,375,152 | B1 | 4/2002 | Weh et al. |
| 6,382,273 | B1 | 5/2002 | Weh et al. |
| 6,890,004 | B2 * | 5/2005 | Naito ............................ 285/93 |
| 7,007,983 | B2 | 3/2006 | Arosio |
| 7,073,773 | B2 | 7/2006 | Nuttall et al. |
| 7,267,140 | B2 | 9/2007 | Weh et al. |
| 7,309,083 | B2 | 12/2007 | Tiberghien et al. |
| 7,431,346 | B2 | 10/2008 | Frost et al. |
| 7,472,930 | B2 | 1/2009 | Tiberghien et al. |
| 7,503,592 | B2 | 3/2009 | Durieux et al. |
| 7,731,253 | B2 | 6/2010 | Gedenk |
| 7,753,415 | B2 | 7/2010 | Tiberghien et al. |
| 7,766,393 | B2 | 8/2010 | Tiberghien et al. |
| 7,938,456 | B2 | 5/2011 | Chambaud et al. |
| 8,123,258 | B2 * | 2/2012 | Tiberghien et al. .......... 285/316 |
| 8,869,819 | B2 * | 10/2014 | Huang et al. .................. 137/231 |
| 2005/0161097 | A1 | 7/2005 | Weh et al. |
| 2005/0167981 | A1 | 8/2005 | Nuttall et al. |
| 2005/0205141 | A1 | 9/2005 | Weh et al. |
| 2005/0212289 | A1 | 9/2005 | Weh et al. |
| 2007/0114794 | A1 * | 5/2007 | Frost et al. .................... 285/317 |
| 2007/0274772 | A1 | 11/2007 | Tiberghien et al. |
| 2007/0277905 | A1 | 12/2007 | Weh et al. |
| 2007/0278791 | A1 | 12/2007 | Tiberghien et al. |
| 2009/0167019 | A1 | 7/2009 | Weh et al. |
| 2010/0288961 | A1 | 11/2010 | Weh |
| 2011/0005639 | A1 | 1/2011 | Weh et al. |
| 2011/0018258 | A1 | 1/2011 | Tiberghien et al. |
| 2011/0263144 | A1 | 10/2011 | Tiberghien et al. |

FOREIGN PATENT DOCUMENTS

| | | | |
|---|---|---|---|
| CA | 2712592 | A1 | 7/2009 |
| DE | 3639528 | A1 | 11/1987 |
| DE | 3815350 | A1 | 11/1989 |
| DE | 20113614 | U1 | 10/2002 |
| DE | 10253684 | A1 | 5/2003 |
| DE | 202004004735 | U1 | 9/2005 |
| DE | 202004008992 | U1 | 9/2005 |
| DE | 202008002211 | U1 | 4/2009 |
| DE | 102009014715 | A1 | 10/2010 |
| DE | 102009042453 | A1 | 3/2011 |
| DE | 202010009871 | U1 | 9/2011 |
| EP | 1862720 | A1 | 12/2007 |
| GB | 2036906 | A * | 7/1980 ............... F16L 37/12 |

* cited by examiner

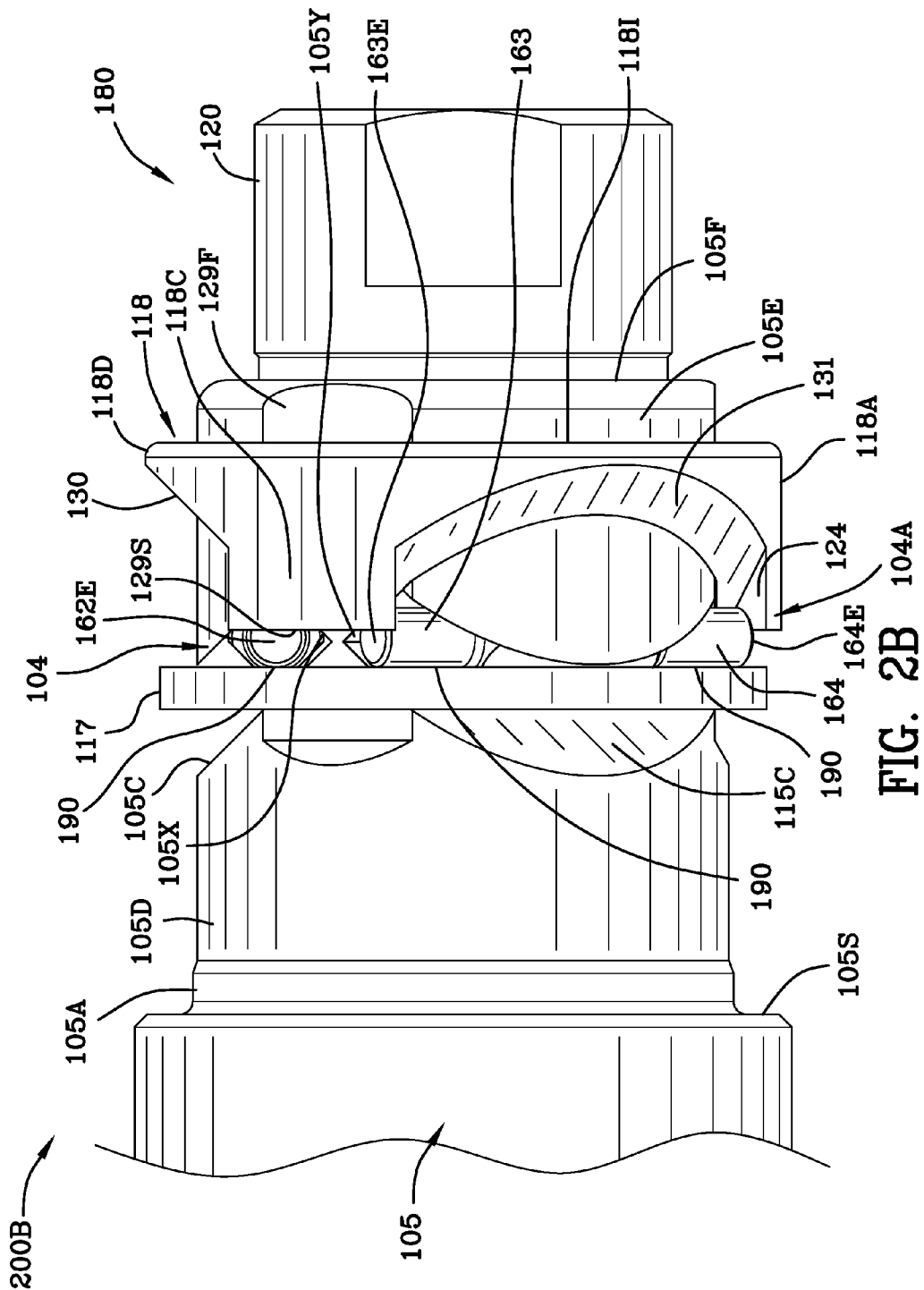

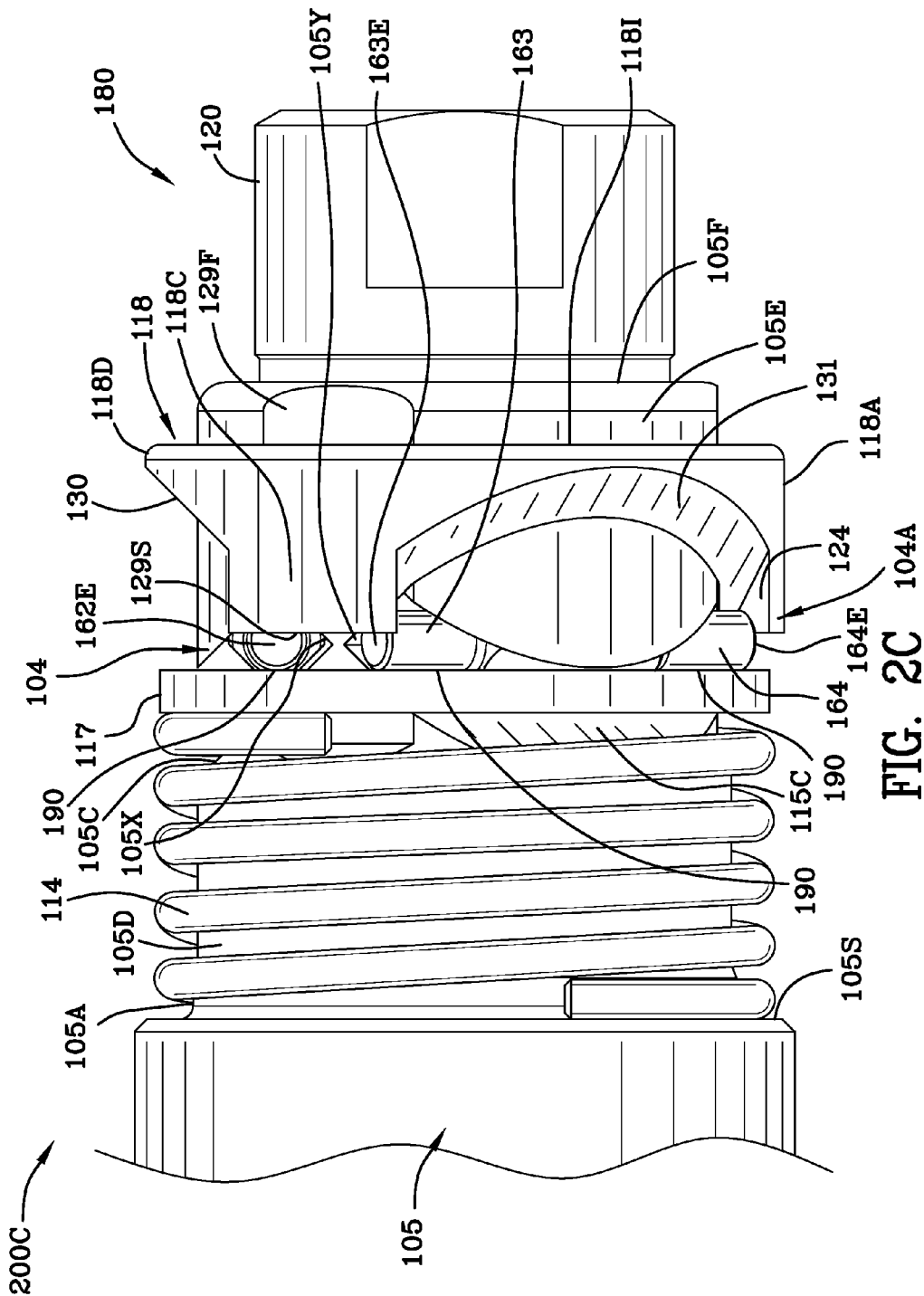

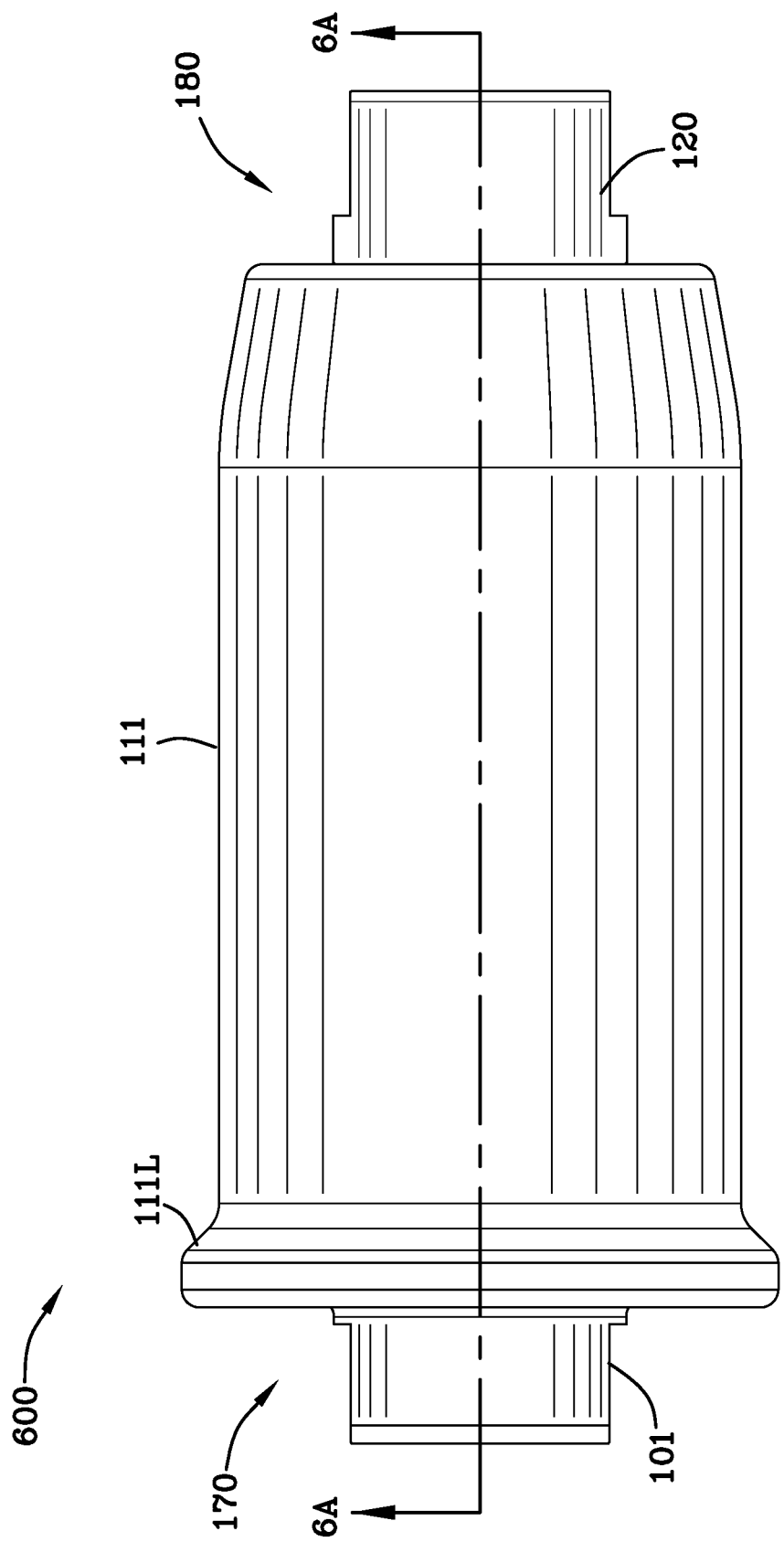

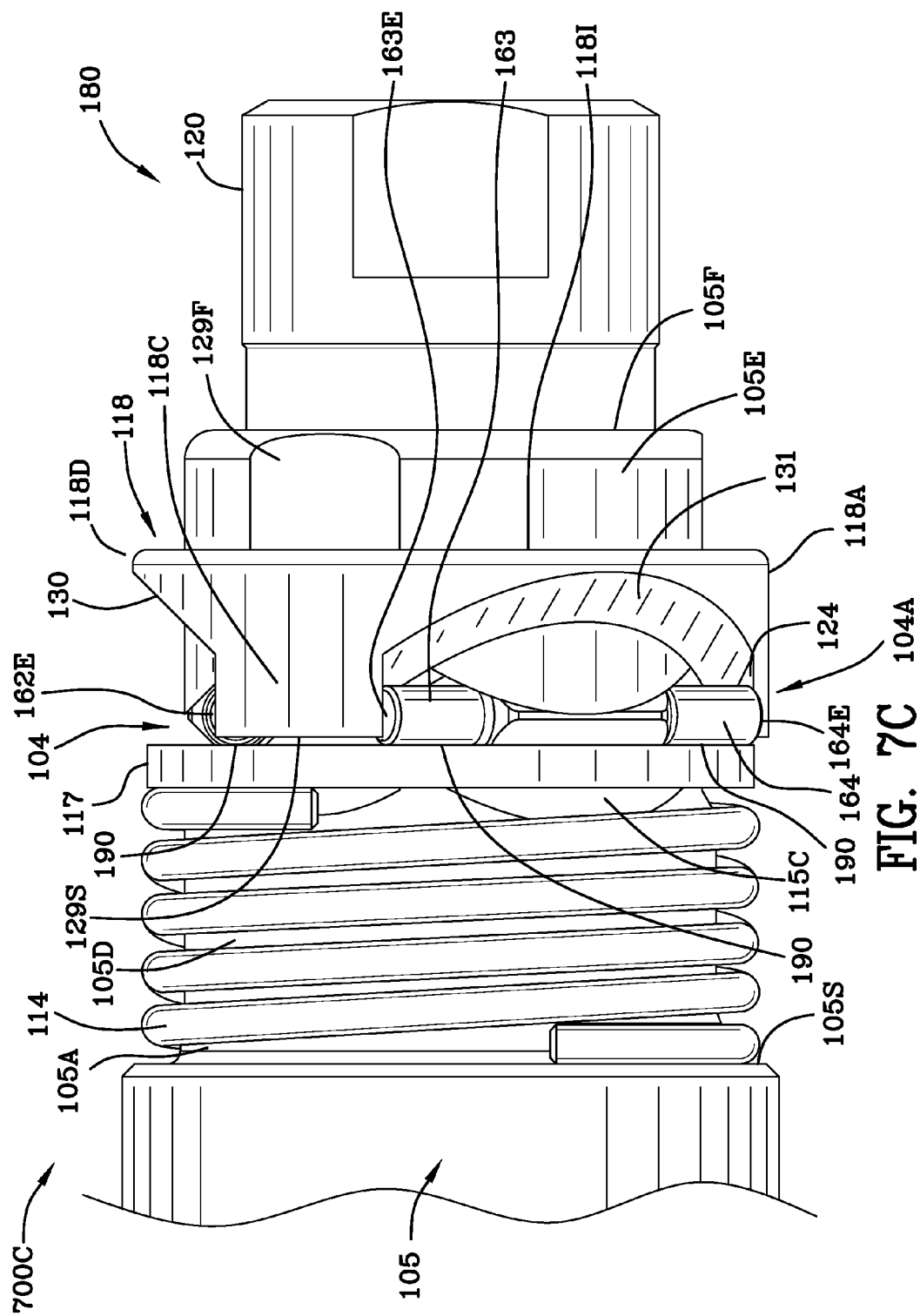

COUPLING WITH LOCKING BARS

FIELD OF THE INVENTION

The field of the invention is couplings.

BACKGROUND OF THE INVENTION

United States Patent Publication No. US2007/0278791, published Dec. 6, 2007, states in the Abstract, as follows: "The female rapid coupling element (A) is adapted to receive a male element (B) by insertion along a longitudinal axis (X-X'). It is equipped with at least one locking member (40), movable on an oblique axis ($X_{27}$-$X'_{27}$) and provided with an end (40b) intended to be engaged in a groove (16) of a male element (B). A head (40e) of the member is provided with at least one lug defining a first surface (40h), oriented towards the end (40b) and adapted to receive in sliding contact a corresponding surface (33b) of a first component (33). The sliding plane ($P_1$) between these surfaces (40h, 33b) is inclined at an angle of between around 75° and 105° with respect to the axis ($X_{27}$-$X'_{27}$) of translation of the member (40). According to the invention, the head (40e) has two lugs arranged on either side of a rod for connection between the end (40b) and the head."

U.S. Pat. No. 7,766,393, issued Aug. 3, 2010, states in the Abstract as follows: "A female element for a coupling that includes a body having a duct for receiving a male element along a coupling axis (X-X') and a locking member including a locking portion, a connecting portion, and a control portion, wherein the locking member extends along the axis (X-X') and is movable between a locked and an unlocked position, and wherein an annular element moves the locking member from the locked to the unlocked position and a resilient member urges the locking member to the locked position, and the female element includes a lateral guide for the connecting portion and the control portion, and a surface of the locking portion that is to come into contact with the male element generally having a shape of a portion of a surface of revolution and a width, in a circumferential direction, that is greater than a width of the control portion and the connecting portion."

U.S. Pat. No. 7,309,083, issued Dec. 18, 2007, states in the Abstract as follows: "A female element for a quick connection for removably joining pipes of fluid under pressure and which is adapted to receive a male element. The female element includes at least one locking member movable within a guide channel that extends transverse with respect to an axis of fit of the male and female elements and which member has one end which is configured and adapted to be cooperatively engaged in a peripheral groove of the male element. The locking member is also provided with a tab which projects radially with respect to a body of the female element and which is cooperatively engaged by two portions of a control ring that is movable over the body of the female element in order to move the locking member within the guide channel between an inner locking position and an outer release position."

U.S. Pat. No. 5,634,524, issued Jun. 3, 1997, states in the Abstract as follows: "A quick disconnect coupler for releasably coupling pipes which incorporates a valve assembly including a valve sleeve, a ring surrounding the sleeve, a spring for resiliently urging the ring relative to the sleeve and a valve seat carried by the ring, which valve assembly may be inserted within a principal member of a female element of the connector and be frictionally retained therein until being mechanically retained by a rear member selectively insertable within the principal member."

SUMMARY OF THE INVENTION

A coupling including a female coupling half and a male coupling half is disclosed. The female coupling half includes a body, a plurality of locking bars, a spring, a locking ring, and, a cam. The body includes a plurality of grooves, an exterior, and an internal bore therethrough. The grooves extend from the exterior of the body to the internal bore. The spring is operable between the body and the locking ring. The locking ring engages the cylindrical portions of the locking bar. The cam slidingly engages the body and the cylindrical portions of the locking bar. The cam is movable between first and second positions and the locking bars are movable between first and second positions. In the first position, the cam permits the locking ring, urged by the spring, to force the plurality of locking bars into their respective grooves in the body extending the locking bars into the internal bore of the body. The internal bore is sometimes referred to hereinafter as the internal longitudinal bore. In the second position, the cam forcefully engages the cylindrical portions of the locking bars and urges the locking bars toward the exterior of the body and out of the internal longitudinal bore against the locking ring compressing the spring. The male coupling half is secured by the locking bars when the cam is in the first position. When the cam is in the first position, it does not forcefully engage the locking bars, rather, the cam resides somewhat loosely about the body of the female member in that it may slide longitudinally along the exterior of the body of the female coupling half.

An outer sleeve slidingly engages the body and positions the cam in the second position against the force of the spring when desired to permit uncoupling the male coupling half and the female coupling half. Each of the locking bars includes a first cylindrical end, a second cylindrical end, and a substantially square, in cross-section, intermediate portion residing between the first and second cylindrical ends. The cam engages the first and second cylindrical end portions of the locking bar.

The substantially square, in cross-section, intermediate portion of the locking bars include an arcuate retaining surface which engages a reciprocally shaped portion of the male coupling half during coupling. Further, the substantially square, in cross-section, intermediate portion of the locking bar includes a first arcuate wall, a second arcuate wall, and an arcuate groove residing between the first arcuate wall and the second arcuate wall.

The substantially square, in cross-section, intermediate portion includes a first face and a second face. The first arcuate wall extends from the first face of the substantially square, in cross-section, intermediate portion to the arcuate groove. The second arcuate wall extends from the second face of the substantially square, in cross-section, portion to the arcuate groove. The arcuate retaining surface is formed in the second face of the substantially square, in cross-section, intermediate portion and grips the male coupling half during coupling.

Each of the locking bars includes a first end, a second end, and a substantially square, in cross-section, intermediate portion. The intermediate portion resides between the first and second ends. The first end of the locking bar includes a first cylindrical portion and a first end surface. The second end of the locking bar includes a second cylindrical portion and a second end surface. The cam is generally cylindrically shaped and includes an inner surface.

Preferably, the cam includes a first post, a second post and a third post. The inner portions of the posts are flat. The cam has an inner surface which is reciprocally shaped with respect to the end portion of the body of the female coupling half. The flat inner portions reside adjacent flat portions on the exterior of the body of the female coupling half. Each of the posts of the cam includes one locking bar end guide surface and another locking bar end guide surface. The cam includes a first cam surface, a second cam surface and a third cam surface. The first cam surface resides between one locking bar end guide surface of the first post and another locking bar end guide surface of the second post. The second cam surface resides between the one locking bar end guide surface of the second post and another locking bar end guide surface of the third post. The third cam surface resides between the one locking bar end guide surface of the third post and another locking bar end guide surface of the first post. The inner surface of the cam is keyed to the body preventing rotation of the cam with respect to the body. The first end surface of the first cylindrical end of the first locking bar is guided by the one locking bar first end guide surface of the first post of the cam. The second end surface of the second end of the first locking bar is guided by another locking bar end guide surface of the second post of the cam. The first end surface of the first end of the second locking bar is guided by the one locking bar first end guide surface of the second post of the cam, the second end surface of the second end of the second locking bar guided by another locking bar end guide surface of the third post of the cam. The first end surface of the first end of the third locking bar is guided by the one locking bar first end guide surface of the third post of the cam. The second end surface of the second end of the third locking bar is guided by another locking bar end guide surface of the first post of the cam.

The first cylindrical portion of the first end of the first locking bar and the second cylindrical portion of the second end of the first locking bar slidingly engage the first cam surface as the cam moves between the first position (not forcefully engaged with the locking bar) and the second position forcefully engaging and urging the locking bar radially outwardly toward the exterior of the body and out of the internal bore of the body enabling disconnection of the coupling. The first cylindrical portion of the first end of the second locking bar and the second cylindrical portion of the second end of the second locking bar slidingly engage the second cam surface as the cam moves between the first position (not forcefully engaged with the locking bar) and the second position forcefully engaging and urging the locking bar radially outwardly toward the exterior of the body and out of the internal longitudinal bore of the body enabling disconnection of the coupling. The first cylindrical portion of the first end of the third locking bar and the second cylindrical portion of the second end of the third locking bar slidingly engage the third cam surface as the cam moves between the first position (not forcefully engaged with the locking bar) and the second position forcefully engaging and urging the locking bar radially outwardly toward the exterior of the body and out of the internal bore of the body enabling disconnection of the coupling. The cam acts simultaneously on the first, second and third locking bars when in second position.

The female coupling half is push-to-connect meaning that the outer sleeve of the female coupling half does not have to be moved against the force of the spring to enable coupling of the male and female coupling halves together. To disconnect and separate the male and female coupling halves, the outer sleeve of the female coupling must engage the cam and move the cam to the second position of the cam which in turn extracts the locking bars from the internal longitudinal bore and enables the extraction of the male coupling half from the female coupling half. Preferably the locking bars are stainless steel. Other materials for the locking bars may be used. The bars may be coated with a coating to add hardness and durability to the surface.

It is an object of the present invention to provide a locking mechanism for a coupling which is durable and which does not cause Burnelling of the locking surfaces of the male coupling half.

It is an object of the present invention to provide a locking mechanism for a coupling which is durable and provides greater surface to surface contact of the locking bars of the female half of the coupling with the locking surface of the male coupling half.

It is an object of the present invention to provide a locking mechanism for a coupling which is durable and secure and which is push-to-connect.

It is an object of the present invention to provide a locking mechanism for a coupling which includes a plurality of locking bars residing in an equal number of grooves.

It is an object of the present invention to provide a locking mechanism for a coupling wherein locking bars reside in generally transverse grooves of a female coupling half and engage corresponding surfaces of the male coupling half.

It is an object of the present invention to provide a cam which has an inner surface which is the reciprocal of the exterior surface of the body of the female coupling half so as to prevent the cam from rotational movement with respect to the body of the female coupling half.

It is an object of the present invention to provide a cam which guides three locking bars. It is an object of the present invention to provide a cam which guides a plurality of locking bars.

It is an object of the present invention to provide a cam movable from a first position of the cam (where the cam does not forcefully engage the locking bars) and where the locking bars reside and are recessed in corresponding grooves of the body of the female coupling half and extend into the internal longitudinal bore of the female coupling half to a second position of the cam where the locking bars are forced and guided by the cam out of the internal longitudinal bore of the female coupling half toward the exterior of the body of the female coupling half.

It is an object of the present invention to provide a female coupling half having a cam having three posts wherein each of the posts includes guides for guiding three locking bars.

It is an object of the present invention to provide a female coupling half having a cam which positions and guides three locking bars residing within three grooves in the body of the coupling half.

It is an object of the present invention to provide a female coupling half which comprises locking bars having first and second cylindrical end portions and a substantially square, in cross-section, intermediate portion. It is a further object of the invention to provide an intermediate portion which can assume any shape in cross-section as along as the cross-sectional shape provides orientation within the grooves in the body of the female coupling half.

It is an object of the present invention to provide a female coupling half which comprises locking bars which include arcuate retaining surfaces.

It is an object of the present invention to provide a female coupling half wherein the substantially square, in cross-section, intermediate portion of the locking bar includes a first arcuate wall, a second arcuate wall, and an arcuate groove residing between said first arcuate wall and said second arcuate wall.

It is an object of the present invention to provide a female coupling half wherein: the substantially square, in cross-section, intermediate portion includes an engagement side which has a first face and a second face; a first arcuate wall extends from the first face of the engagement side of the substantially square, in cross-section, intermediate portion to an arcuate groove; the second arcuate wall extends from the second cut-away face of the engagement side of the substantially square, in cross-section, intermediate portion to the arcuate groove; and, the arcuate retaining surface is formed in the second face of the engagement side of the substantially square, in cross-section, portion.

It is an object of the present invention to provide a spring operable between the female body and the locking ring, the locking ring engaging the first and second cylindrical portions of the locking bars. It is a further object of the present invention to provide locking bars which have end portions with the same geometry as the intermediate portion of the locking bars.

It is an object of the present invention to provide a cam movable from a first position of the cam (where the cam does not forcefully engage the locking bars) and where the locking bars reside and are recessed in corresponding grooves of the body of the female coupling half and extend into the internal longitudinal bore of the female coupling half under the force of a spring-loaded locking ring to a second position of the cam where the locking bars are forced and guided by the cam out of the internal longitudinal bore of the female coupling half toward the exterior of the body of the female coupling half against the force of the spring-loaded locking ring.

It is an object of the present invention to provide a spring biased locking ring which engages the cylindrical end portions of the locking bars biasing the locking bars to their first position, the locking position.

These and other objects will be better understood when reference is made to the drawings and the description of the invention below.

BRIEF DESCRIPTION OF THE DRAWINGS

FIG. 2B is an enlarged side view of FIGS. 2 and 2A illustrating the locking ring engaging cylindrical portions of two locking bars.
FIG. 2C is an enlarged side view of FIG. 2B together with the spring operable between a shoulder on the body and the locking ring.

FIG. 6 is a plan view of the coupling in the process of being connected or disconnected.
FIG. 7C is an enlarged side view of FIG. 7B together with the spring operable between a shoulder on the body and the locking ring.

DESCRIPTION OF THE INVENTION

Figure 1:
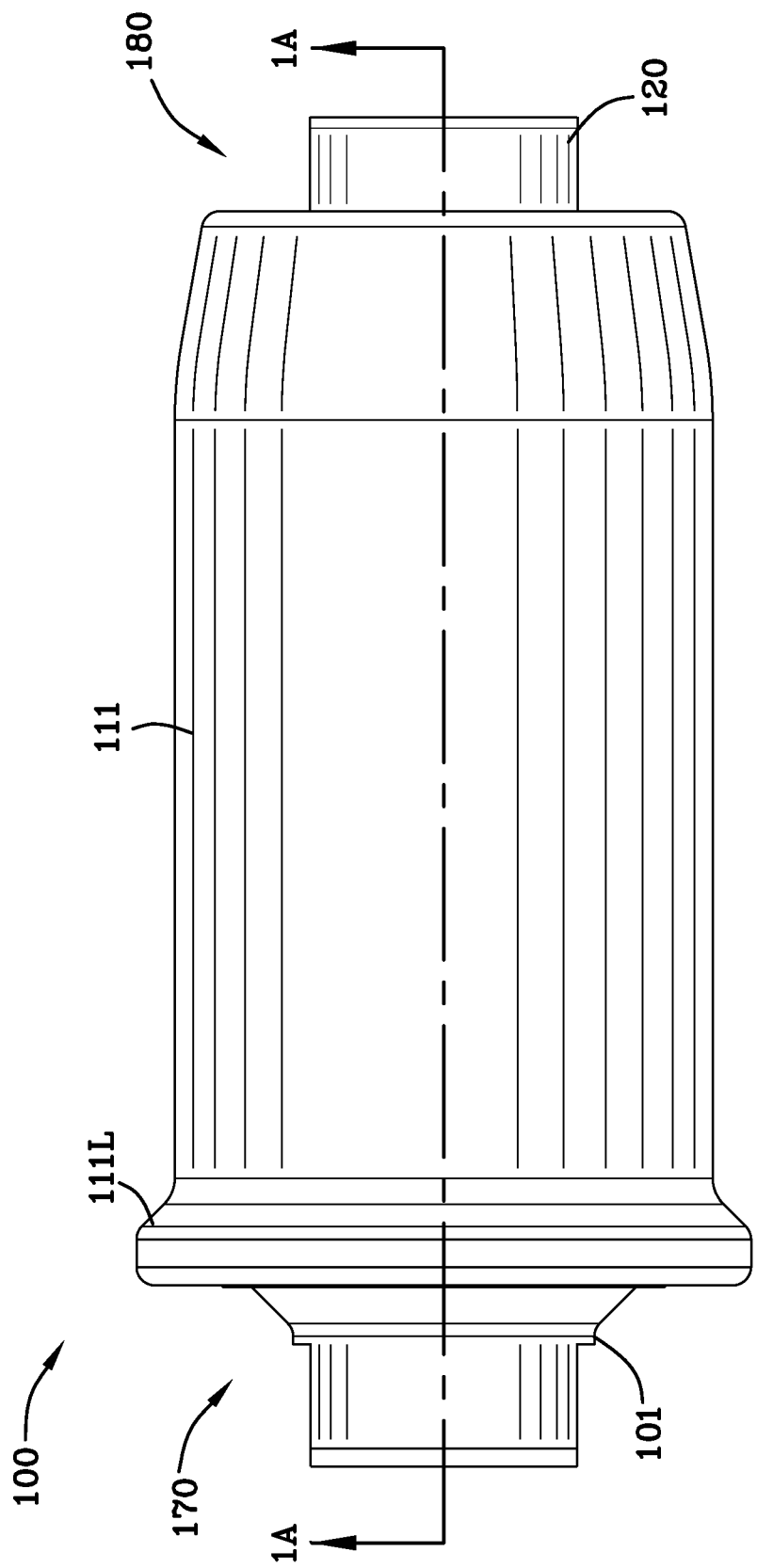
FIG. 1 is a plan view of the coupling fully coupled.
Figure 1A:
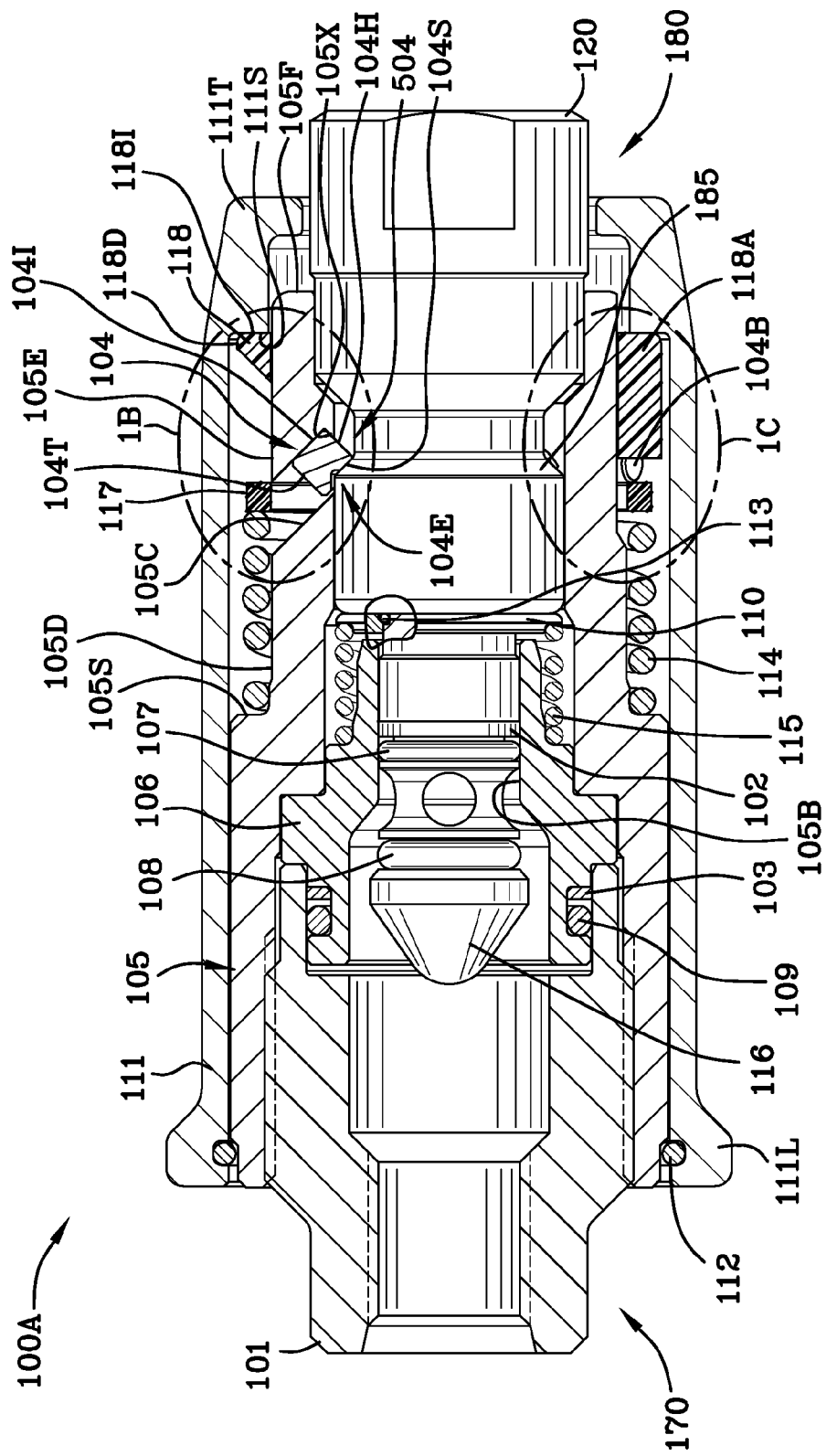
FIG. 1A cross sectional view of the coupling fully coupled.

FIG. 1 is a plan view 100 of the coupling fully coupled. The coupling includes a female coupling half 170 and a male coupling half 180. Outer sleeve 111 includes shoulder 111L which enables gripping the outer sleeve so as to retract the sleeve against the force of spring 114 enabling the male coupling half 180 to be separated (uncoupled) from the female coupling half 170. Female adaptor 101 is illustrated in FIG. 1 as is the end 120 of the male coupling half 180.
FIG. 1A is a cross sectional view 100A of the coupling fully coupled taken along the lines 1A-1A of FIG. 1. The female coupling half 170 includes a body 105, a plurality of locking bars 104, 104A, 104B, a spring 114, a locking ring 117, and, a cam 118. Body 105 includes a plurality of grooves 105C, 115C, 125C, an exterior 105O, and an internal longitudinal bore 105B therethrough. Grooves 105C, 115C, 125C extend from the exterior 105O of the body to the internal longitudinal bore 105B and are oriented transversely with respect to the internal longitudinal bore 105B. Internal longitudinal bore 105B is best viewed in FIG. 3C. Locking bar 104 resides in internal longitudinal bore 105B and is oriented transversely with respect to the internal longitudinal bore. Stops 105X, 105Y and 105Z in grooves 105C, 115C and 125C, respectively, limit the radial inward movement of the locking bars 104, 104A, 104B, respectively. Spring 114 is operable between the body 105S and locking ring 117. Locking ring 117 engages the locking bars 104, 104A, 104B as illustrated prominently in FIGS. 2, 2A, 2B, and 2C. Preferably three locking bars 104, 104A, and 104B are used. However, fewer than or more than three locking bars may be used. As the coupling size increases, then more locking bars may be used. The coupling illustrated herein is 0.375 inches in diameter. Couplings of any size may be manufactured and used with the teachings disclosed herein.

Figure 8:
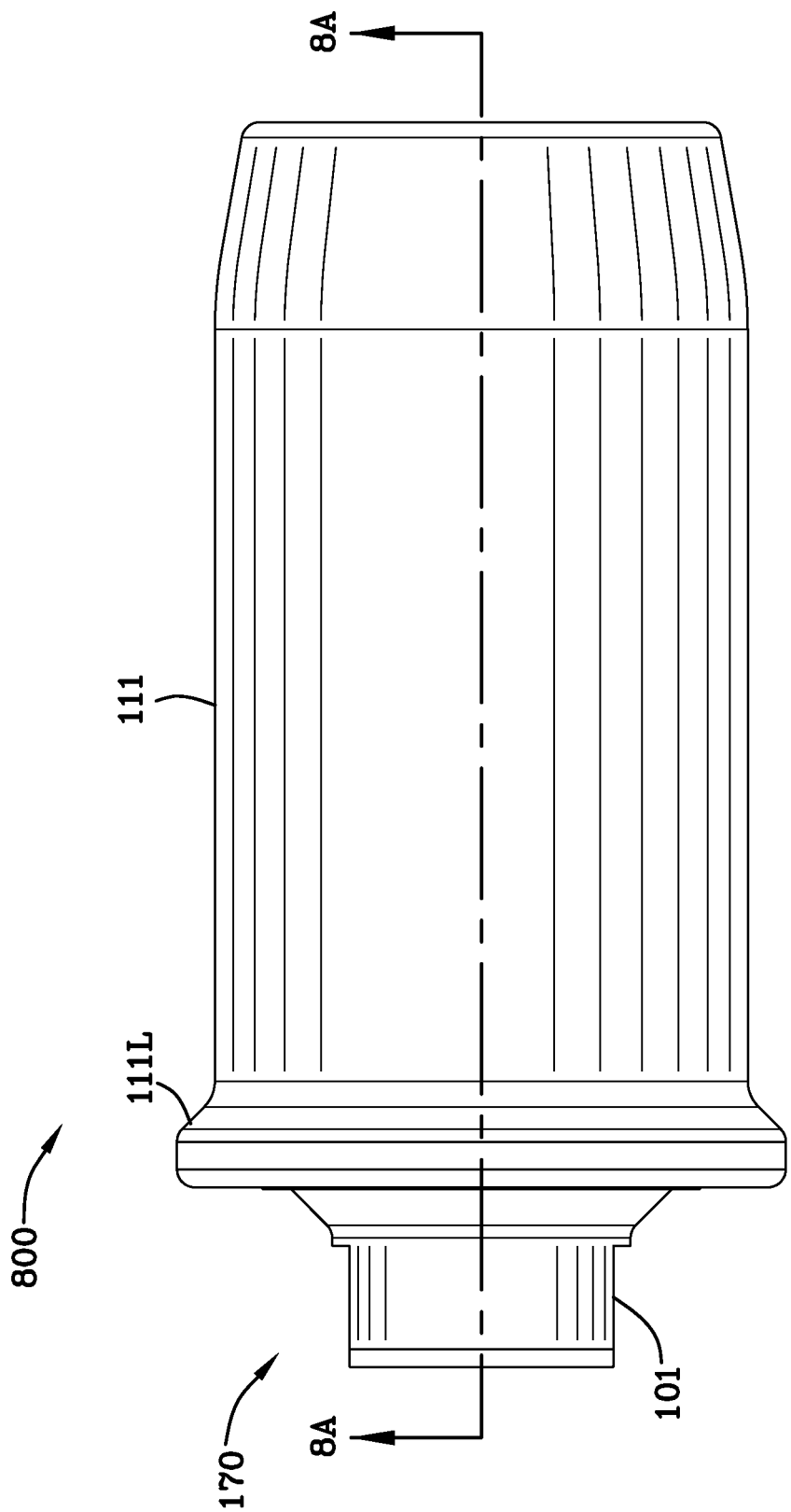
FIG. 8 is a plan view of the female coupling half.
Figure 8A:
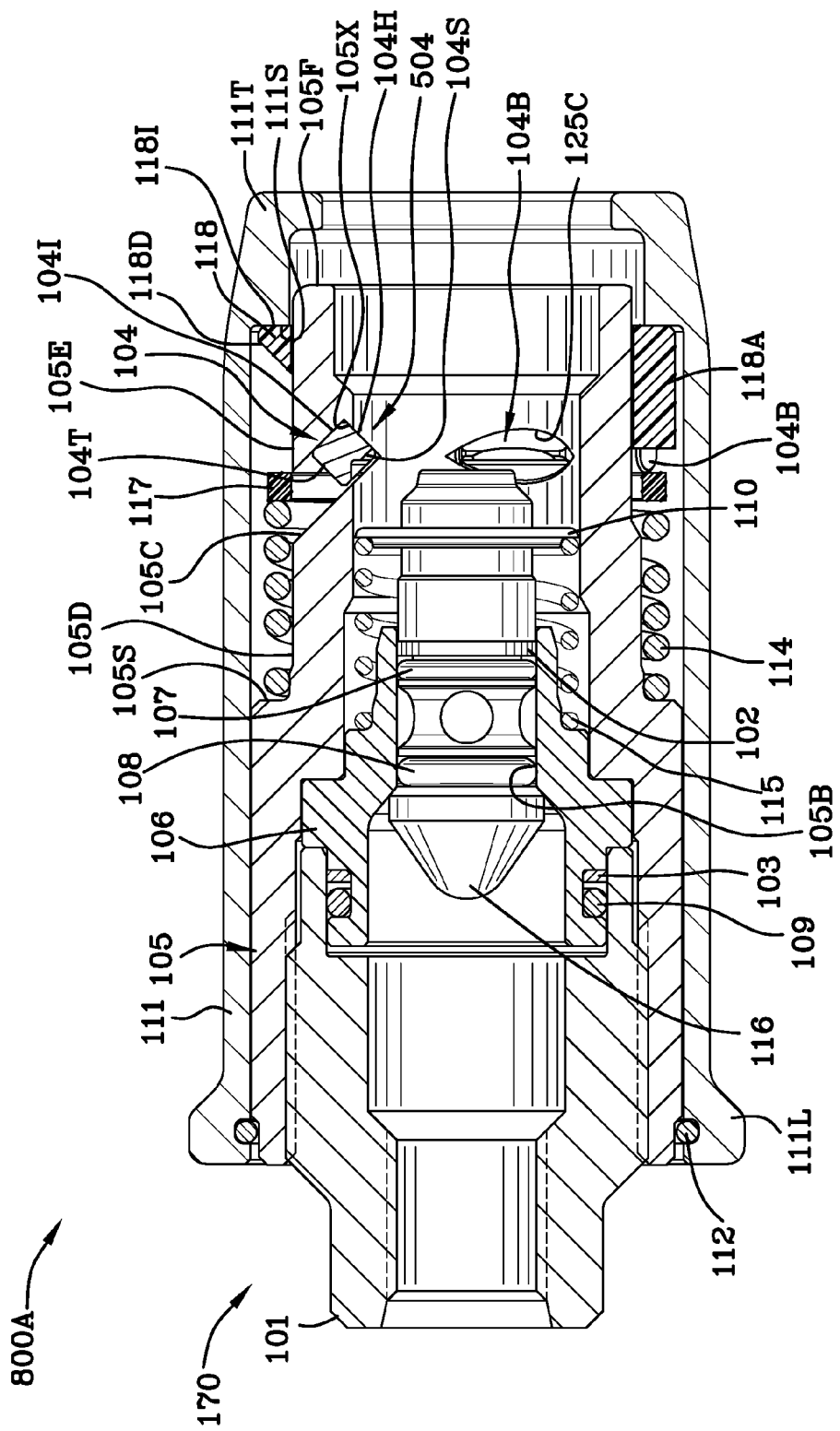
FIG. 8A is a cross-sectional view of FIG. 8 taken along the lines 8A-8A of FIG. 8.

Referring to FIG. 8A, seals 107, 108, back-up ring 102, and valve 116 are illustrated with the female coupling half uncoupled from the male coupling half. FIG. 8 is a plan view 800 of the female coupling half 170 uncoupled and FIG. 8A is a cross-sectional view 800A of FIG. 8 taken along the lines 8A-8A of FIG. 8. Retainer 110 is affixed to valve 116 by snap ring 113 (not shown). Valve guide 106 and spring 115 are illustrated in FIGS. 1A and 8A. FIG. 1A illustrates the female coupling half 170 coupled to the male coupling half 180 such that fluid is communicated through the female coupling half in and through valve 116 by way of unnumbered ports in valve 116. Female adapter 101 secures valve guide 106 into engagement with body 105. Seal 109 and back-up ring 103 seal the interface of the valve guide 106 and the adaptor 101. Flow as illustrated in the drawings is from the natural gas supply side (female coupling half) to the automobile side (male coupling half). In the application illustrated herein, the male coupling half is affixed to a vehicle and the female coupling half is connected to the natural gas source which is under pressure. A pressure regulator may be employed in the appropriate position. It will be understood by those skilled in the art that the flow of gas or fluids may be in either direction, in other words, flow may be from the male coupling half to and through the female coupling half.

Still referring to FIG. 1A, snap ring 112 is carried in outer sleeve 111. Tapered end portion of sleeve 111 substantially covers face 105F of body 105. Snap ring 112 engages an unnumbered shoulder on body 105 and limits movement of the sleeve 111 rightwardly, and hence limits movement of the cam 118, ensuring that cam 118 always is in contacting engagement therewith. Cam 118 interfits the cylindrical portions of the locking bars 104, 104A, and 104B.

Figure 9:
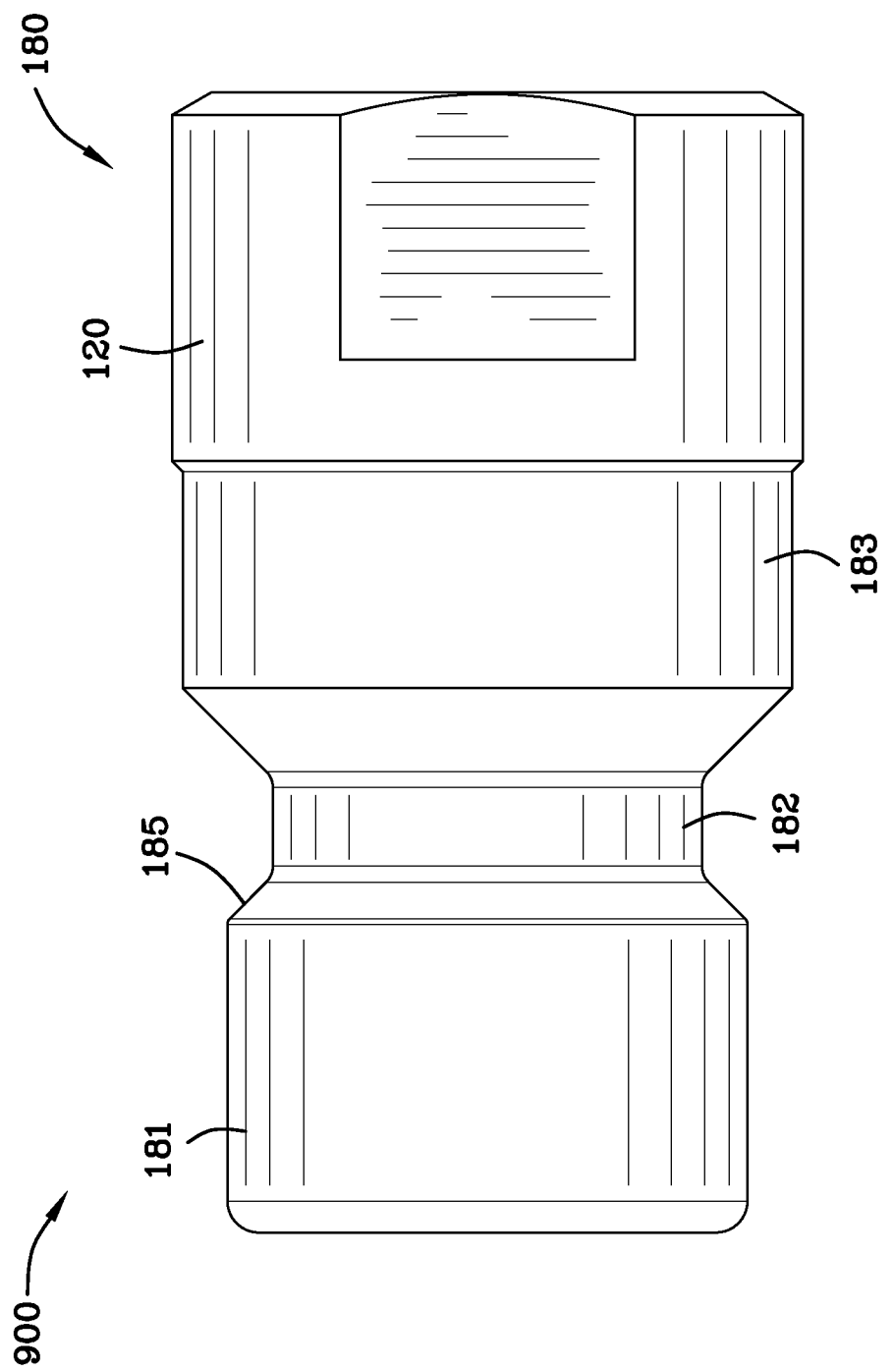
FIG. 9 is a plan view of male coupling half.
Figure 10:
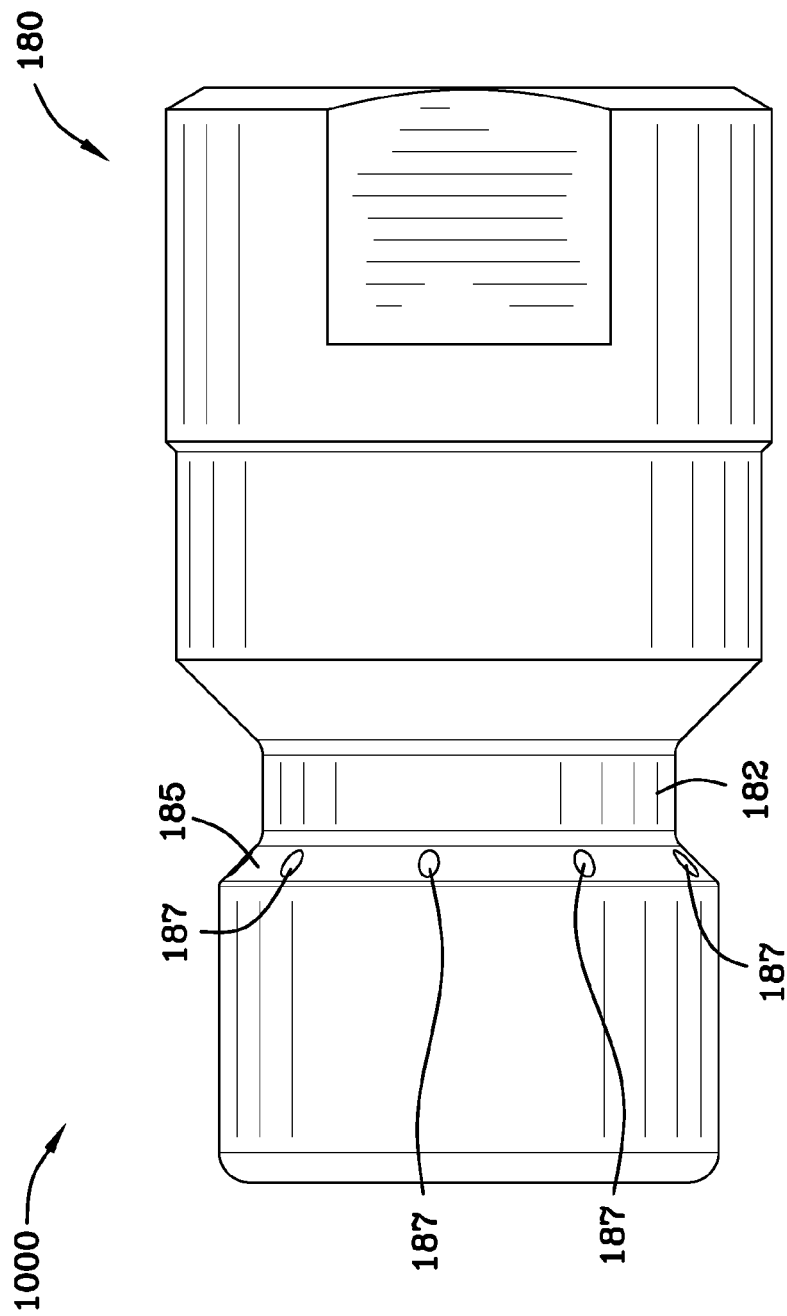
FIG. 10 is a view of a prior art male coupling half.

FIG. 9 is a plan view 900 of male coupling half 180 and FIG. 10 is a view 1000 of a prior art male coupling half. Prior art ISO male coupling half 180 includes a groove 182, engaging surface 185 of male coupling half, and the pockmarked/deformed portions 187 of engaging surface 185 caused by Brunelling. Deformed portions 187 of engaging surface 185 are created by the repeated pressurization and rotation of the coupling halves and the resulting separation force acting on the locking the balls (not shown) of the female coupling half.

The instant invention provides a large surface area contact between surface 185 of the male coupling half and the retaining surfaces 104S of the locking bars 104, 104A and 104B wherein there is no damage to the surface 185 ensuring that the coupling halves 170, 180 are secured together without deformation to surface 185 and enabling reliable functionality of the coupling.

Referring to FIG. 1A, spring 114 operates between shoulder 105S and locking ring 117. Locking ring 117 and cam 118 may be made of plastic or metal. Materials such as steel, stainless steel, and other metals can be used. Internal longitudinal bore 105B is a stepped bore as illustrated in FIGS. 1A and 3C. Reference numeral 105D indicates the intermediate portion of the body 105 and reference numeral 105E indicates the end portion of the body 105. Reference numeral 118D indicates a thin cross-sectional area where the cam surface extends to the exterior of the cam 118. Post 118A is illustrated in FIG. 1A and will be explained in further detail hereinbelow. Arrow 104 indicates locking bar 104 and retaining surface 104S is illustrated in engagement with surface 185 which is the corresponding engagement surface of the male coupling half 180. Top surface 104T and bottom surface 104H of locking bar 104 are illustrated in FIG. 1A. Arrow 104E illustrates the engagement side 104E of locking bar 104. Cam 118, locking ring 117, and sleeve 111 are in their first positions in FIGS. 1A, 2, 2A, 2B and 2C. It is important to note for clarity that the spring 114 is not shown in FIGS. 2, 2A and 2B. It is important to note that the cam 118 as illustrated in FIG. 1A is not forcefully urged into engagement with the locking bars 104, 104A, 104B, rather it is longitudinally loose fitting and there is some play for the cam to slide and move longitudinally.

Figure 1B:
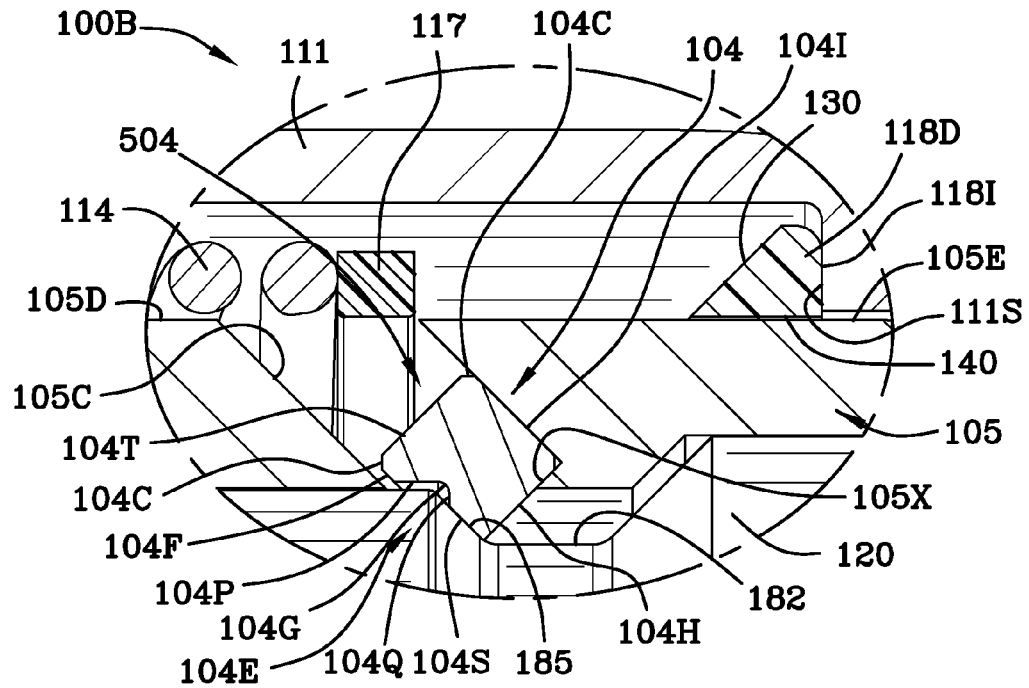
FIG. 1B is an enlargement of a portion of FIG. 1A.
Figure 1C:
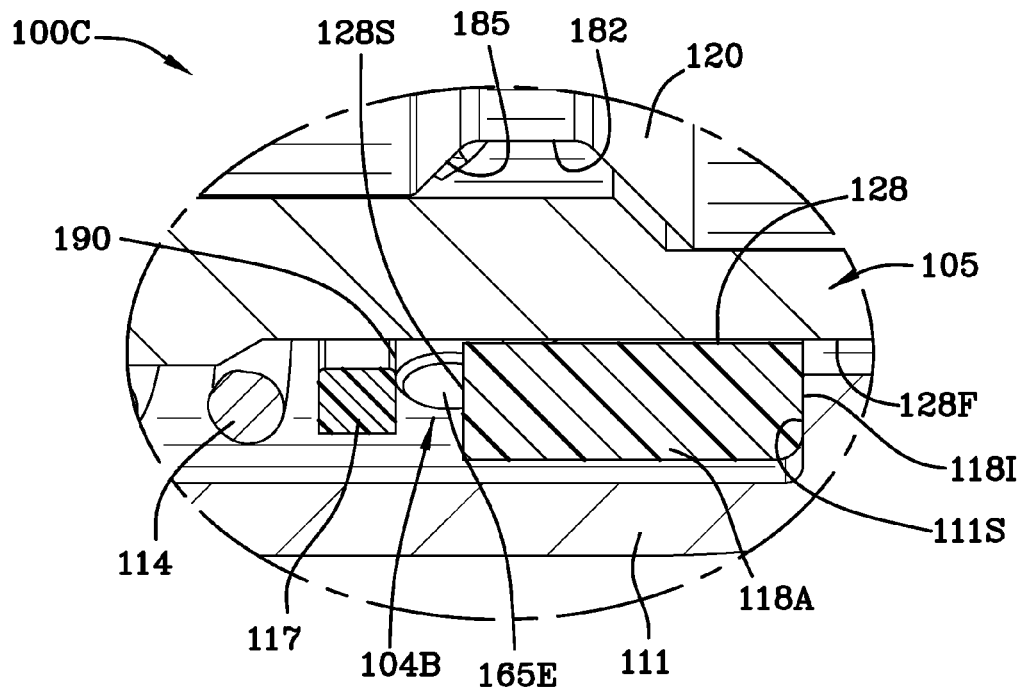
FIG. 1C is an enlargement of a portion of FIG. 1A.

FIG. 1B is an enlargement 100B of a portion of FIG. 1A and illustrates the substantially square, in cross-section, intermediate portion 504 of locking bar 104 in groove 104C. See FIG. 5 for an illustration of locking bar 104. Retaining surface 104S engages surface 185 of male coupling half. Retaining surface 104S is an arcuate retaining surface with a large contact area which mates with, and reliably secures, the male coupling half to the female coupling half. FIG. 9 illustrates the cylindrical groove 182 and the circumferential surface 185. Retaining surface 104S has a shape that is reciprocal to surface 185. Surface 104I of locking bar 104 is opposite engagement side 104E which engages groove 105C as illustrated in FIGS. 1A and 1B. FIG. 1C is an enlargement 100C of a portion of FIG. 1A and illustrates locking ring 117 in engagement 190 with third locking bar 104B. When the male and female coupling halves are fully coupled, cam 118 can move out of engagement with the locking bars.

Figure 5:
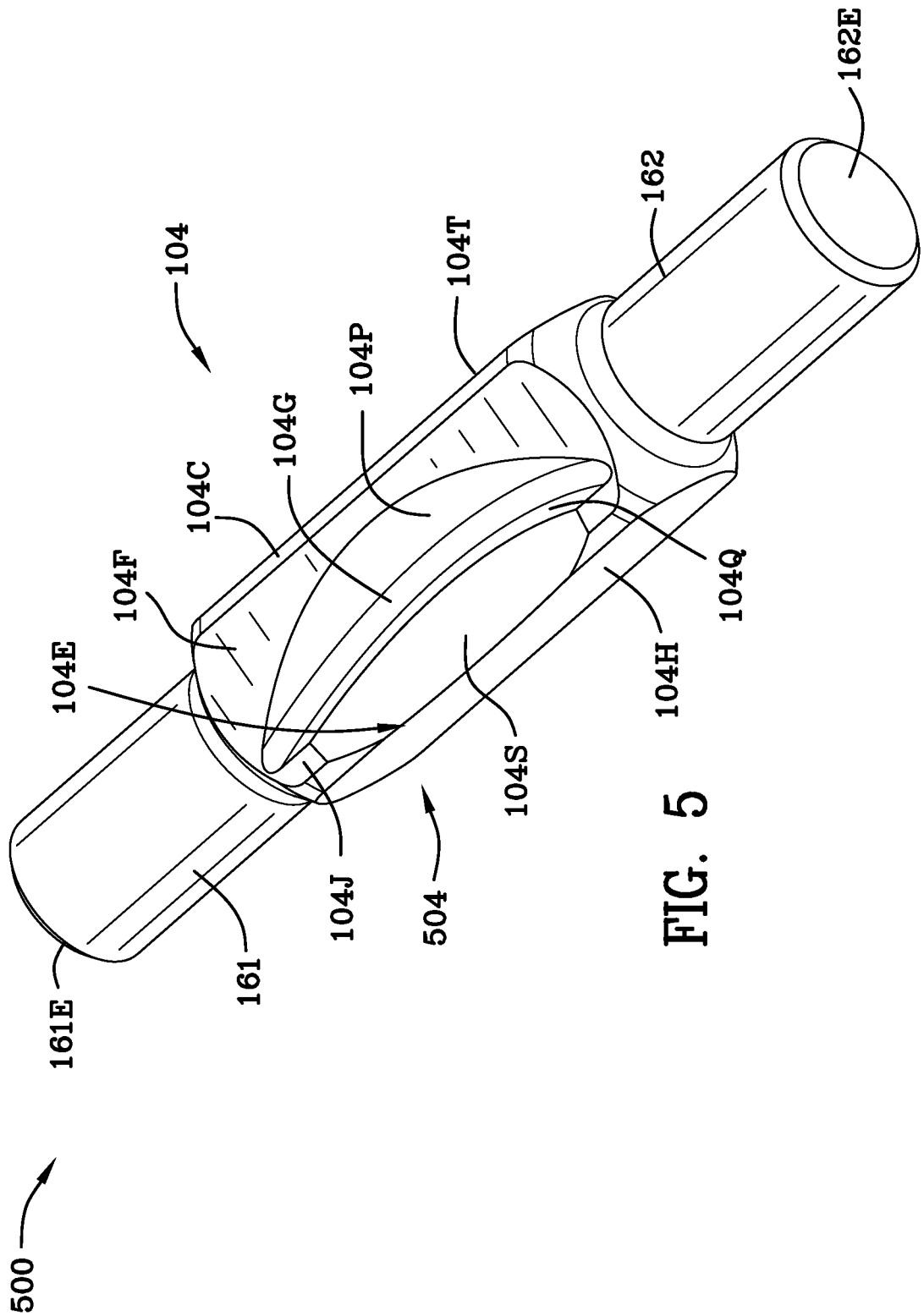
FIG. 5 is a perspective view of a locking bar illustrating: first and second cylindrical portions and an intermediate portion residing between the first and second cylindrical portions; chamfered ends of the locking bars; the engagement side of the locking bar having first and second faces, a first arcuate wall extending from the first face to a groove which extends in a partial arc, a second arcuate wall extending from the second face to the groove, and a retaining surface formed in the second face; and, the top of the locking bar.

FIG. 5 is a perspective view 500 of locking bar 104 illustrating: first 161 and second 162 cylindrical portions, and, intermediate portion 504. FIG. 5 also illustrates chamfered corners 104C of locking bar 104. Engagement face 104E of locking bar 104 is illustrated. Locking bars 104A, 104B are identical to locking bar 104 and therefore they are not independently described.

Still referring to FIG. 5, engagement side 104E includes a first face 104F and a second face 104J. A first arcuate wall 104P extends from the first face 104F to an arcuate groove 104G.

A second arcuate wall 104Q extends from the second face 104J to arcuate groove 104G. Retaining surface 104S is cut and formed in the second face 104J. Top 104T of the locking bar 104 is illustrated in FIG. 5. Bottom 104H is also illustrated in FIG. 5. Cylindrical end portions and end surfaces 161E, 162E are also illustrated in FIG. 5.

Figure 5A:
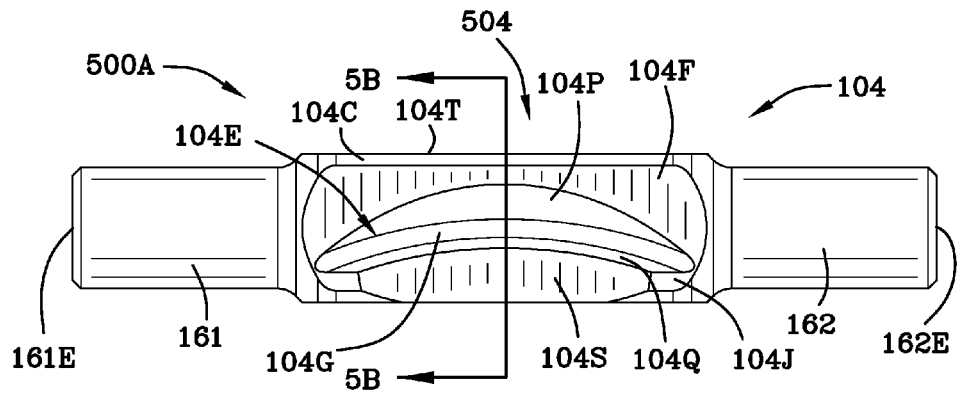
FIG. 5A is a front view of one of the locking bars illustrating the engagement side of the locking bars.
Figure 5B:
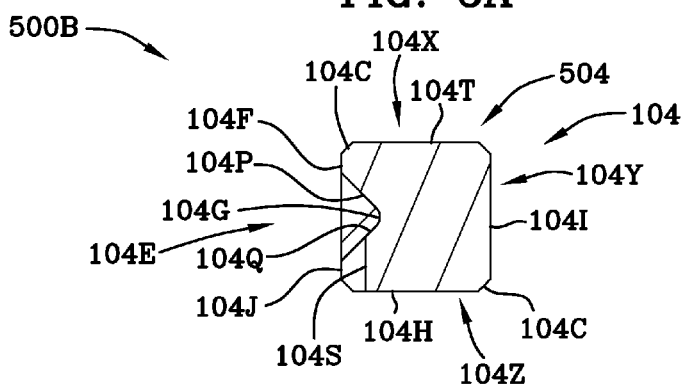
FIG. 5B is a cross-sectional view taken along the lines 5B-5B.

FIG. 5A is a front view 500A of locking bar 104 illustrating the engagement side 104E. FIG. 5B is a cross-sectional view 500B taken along the lines 5B-5B of FIG. 5A illustrating first face 104F, the second face 104J, the first arcuate surface 104P extending to arcuate groove 104G, and the second arcuate surface 104Q extending to arcuate groove 104G and the retaining surface 104S cut into second face 104J. Arrow 104X indicates the second side of the locking bar 104, arrow 104Y indicates the third side of the locking bar 104, and, arrow 104Z indicates the fourth side of the locking bar.

Figure 5C:
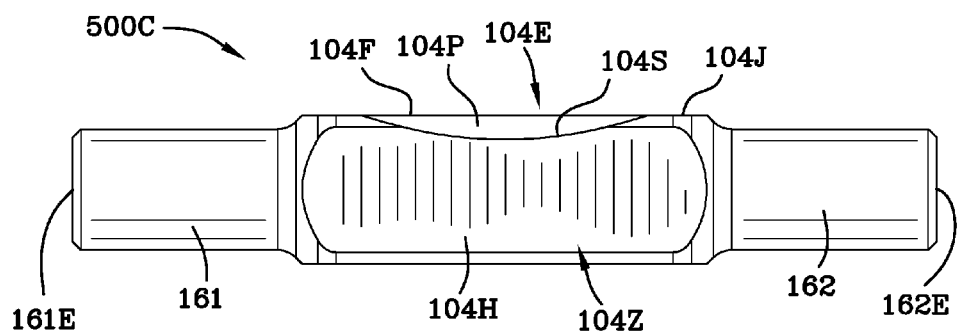
FIG. 5C is a bottom view of one of the locking bars illustrating the bottom side of the locking bars.
Figure 5D:
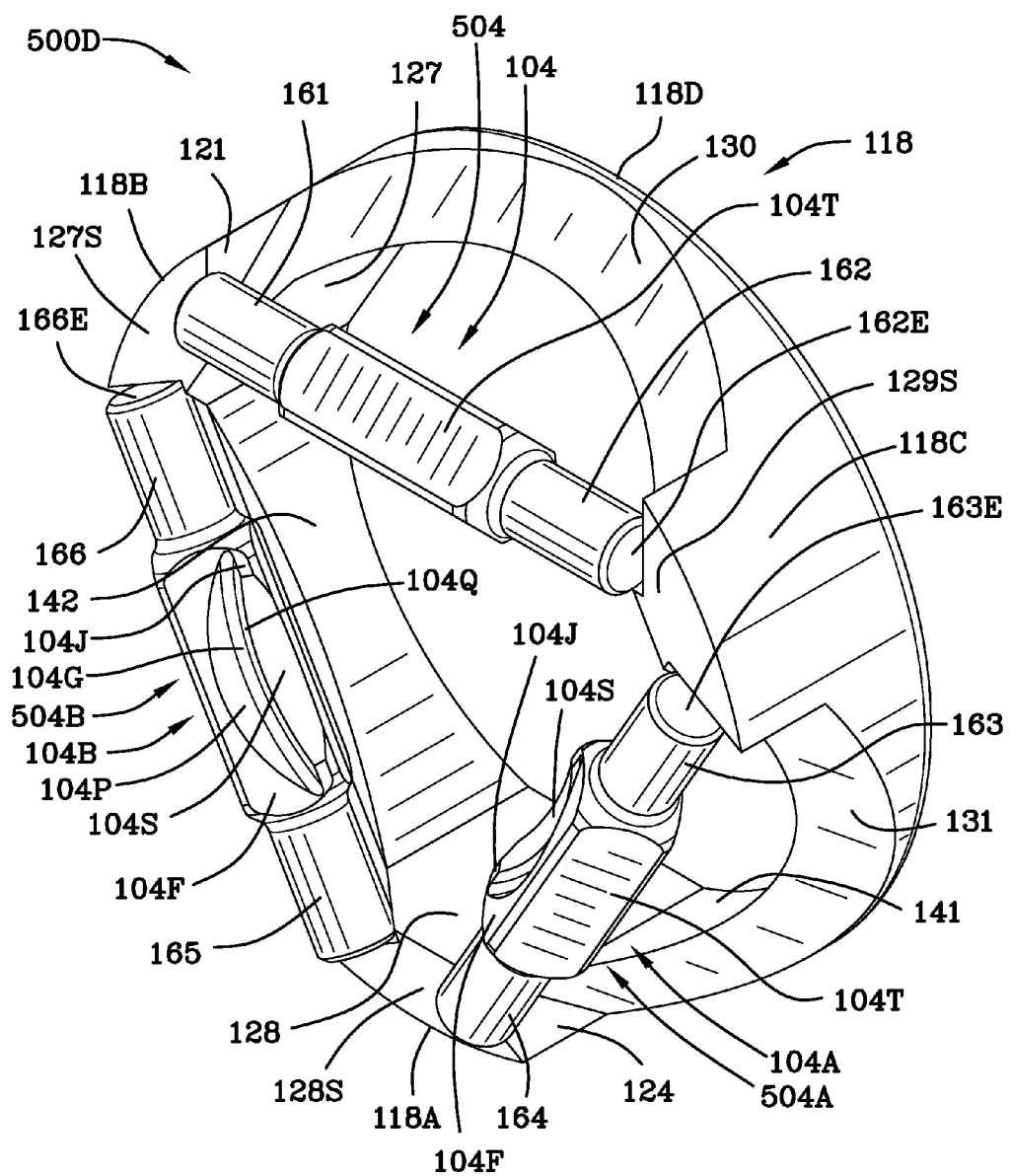
FIG. 5D is a perspective view of the cam and three locking bars.

FIG. 5C is a bottom view 500C of locking bar 104 illustrating the bottom side 104H thereof. FIG. 5F is a view 500F similar to FIG. 5A with a coating 186 over locking bar 104. Coating 186 is indicated by dots and the coating may be a chromium based material. FIG. 5G is a cross-sectional view 500G taken along the lines 5G-5G of FIG. 5F illustrating coating 186 on the exterior of locking bar 104 as a relatively dark line 186. The coating is durable.

Figure 2:
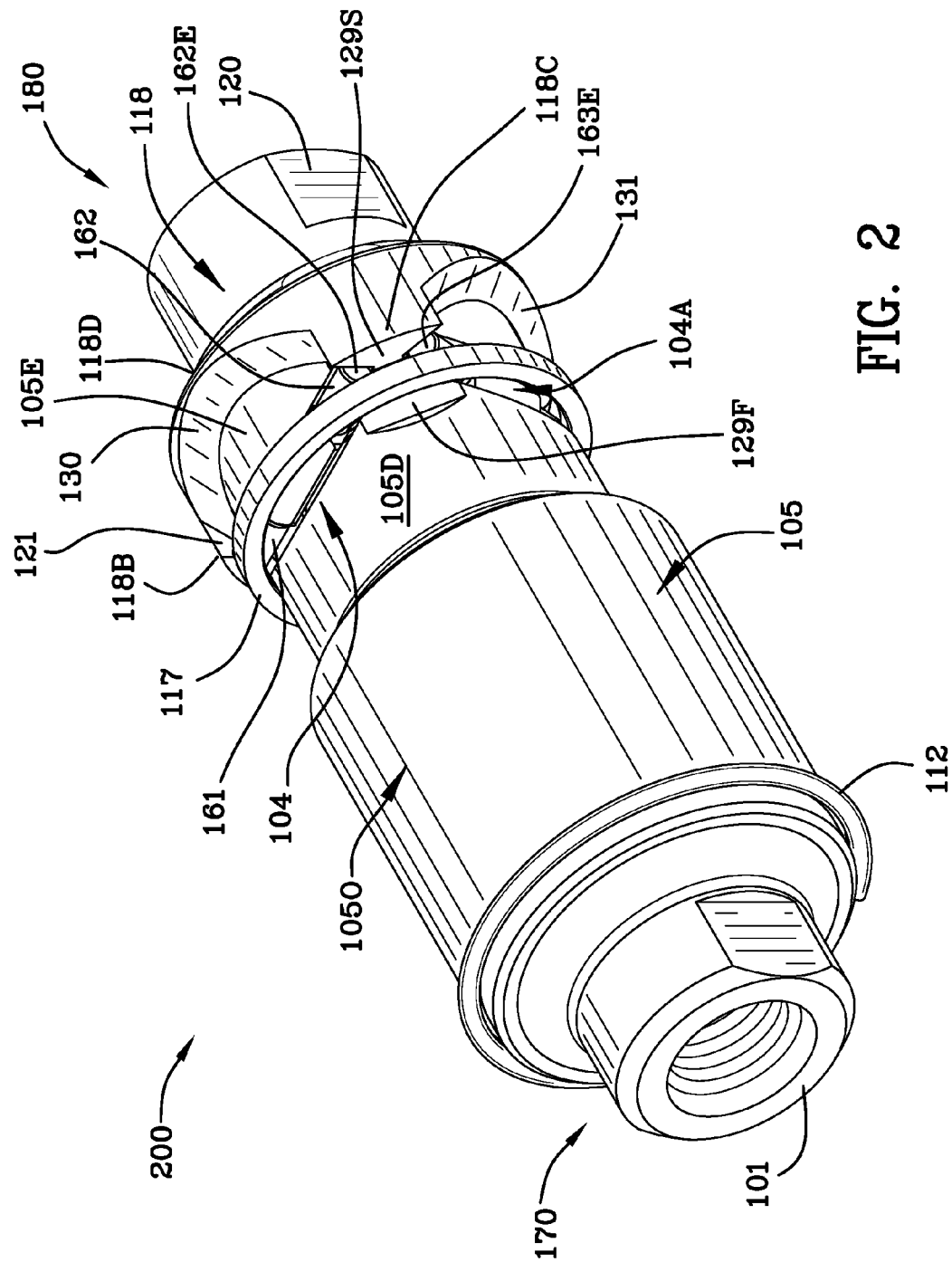
FIG. 2 is a perspective view of the body of the female coupling half fully connected illustrating the cam and the locking ring without the spring and sleeve illustrated.

FIG. 2 is a perspective view 200 of the body 105 of the female coupling half 170 fully connected with male coupling half 180 illustrating the cam 118 and the locking ring 117 without the spring 114 and sleeve 111 illustrated so as to better visualize the relationship and position of the cam 118, the locking bars 104, 104A and the locking ring.

Figure 2A:
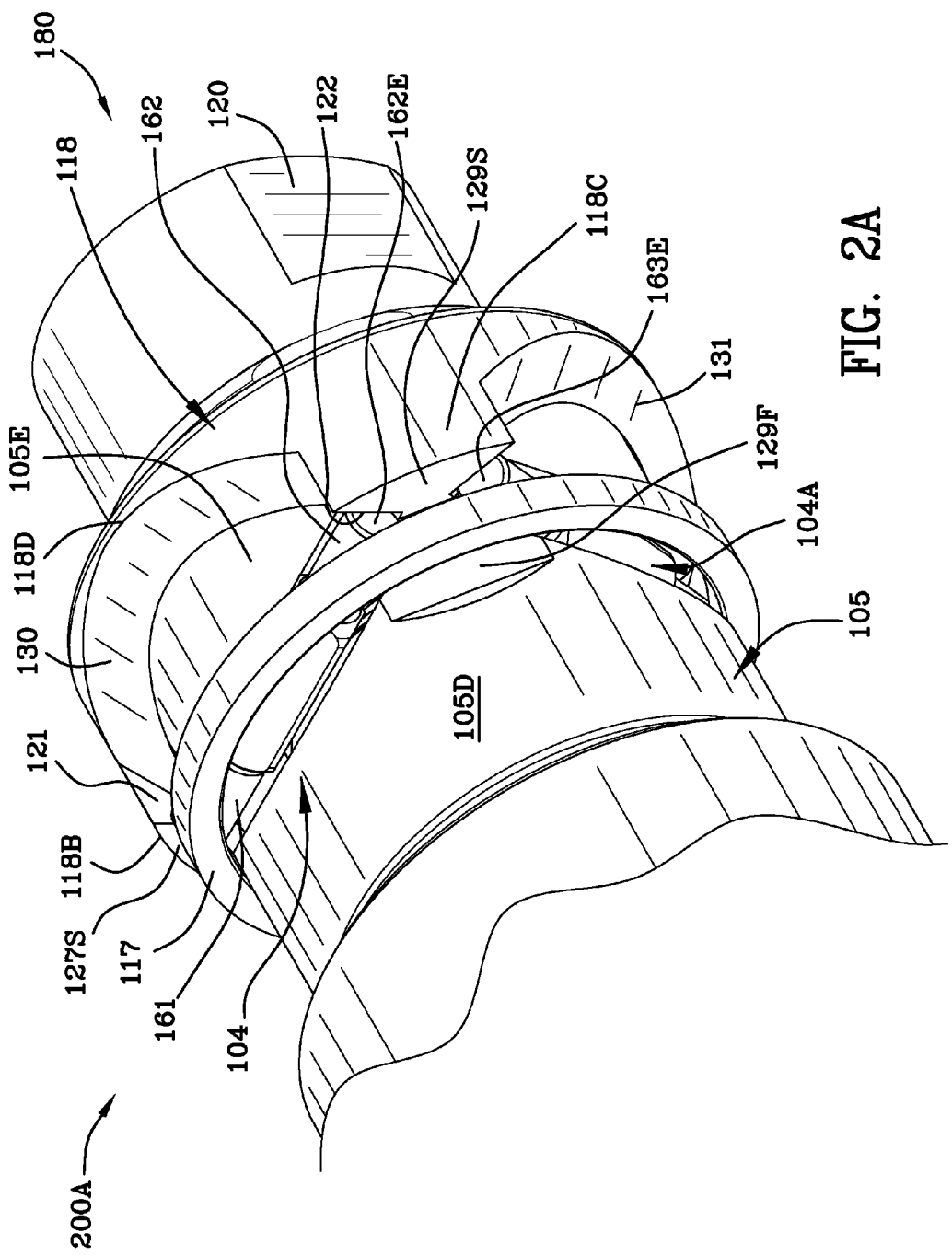
FIG. 2A is an enlargement of a portion of FIG. 2.

FIG. 2A is an enlargement 200A of the end portion of FIG. 2 with the coupling fully coupled. Cam surfaces 130, 131 are illustrated well in FIG. 2. Additionally, locking bars 104, 104A are illustrated in engagement with locking ring 117. Arrow 105O indicates the exterior of body 105. Body 105 includes an intermediate portion 105D and an end portion 105E. Locking ring 117 is illustrated abutting cylindrical portions 161, 162 of locking bar 104. Locking ring 117 is illustrated abutting cylindrical portion 163 of locking bar 104A.

FIG. 2B is an enlarged side view 200B of FIGS. 2 and 2A. FIGS. 2 and 2A illustrate the locking ring 117 engaging cylindrical portions 161, 162 of locking bar 104. It should be noted that locking ring 117 does not engage the substantially square, in cross-section, intermediate portion of any of the locking bars 104, 104A, 104B. FIG. 2B illustrates grove 105C with locking bar 104 therein. Locking ring 117 is illustrated engaging 190 locking bars 104, 104A. Spring 114 is not shown in FIG. 2B for clarity of the other elements. Reference numeral 118I indicates the end of cam 118 which engages shoulder 111S of sleeve 111 as illustrated in FIG. 1A. As illustrated in FIG. 1A, end 118I of the cam 118 may engage or be slightly separated from the inner shoulder 111S of the sleeve when the cam 118 is in the first position.

FIG. 2C is an enlarged side view 200C of FIG. 2B together with the spring 114 operable between shoulder 105S on the body 105 and the locking ring 117. Spring 114 is illustrated on raised ridge 105A adjacent shoulder 105S. Locking ring 117 is illustrated engaging 190 locking bars 104, 104A and cam 118 is positioned in the first position. In the first position, cam 118 somewhat loosely engages: the cylindrical portions 161, 162 of locking bar 104; the cylindrical portions 163, 164 of locking bar 104A; and, the cylindrical portions 165, 166 of locking bar 104B and maintains the locking bars within the end guides of the cam. Referring to FIGS. 1A and 2C, the position of the cam 118 is identical in both views. Sleeve 111 and snap-ring 112 position shoulder 111S against surface 118I of the cam and maintain the position of the cam as shown. As shown, shoulder 111S is shown in engagement with surface 118I, however, there may be a small space between the cam and the sleeve while the cam is in first position. In the first position of the cam 118, it does not forcefully engage the locking bars 104, 104A and 104B. Cam 118 in its first position is aligned with the locking bars such that it may guide them out of their respective grooves.

Figure 3:
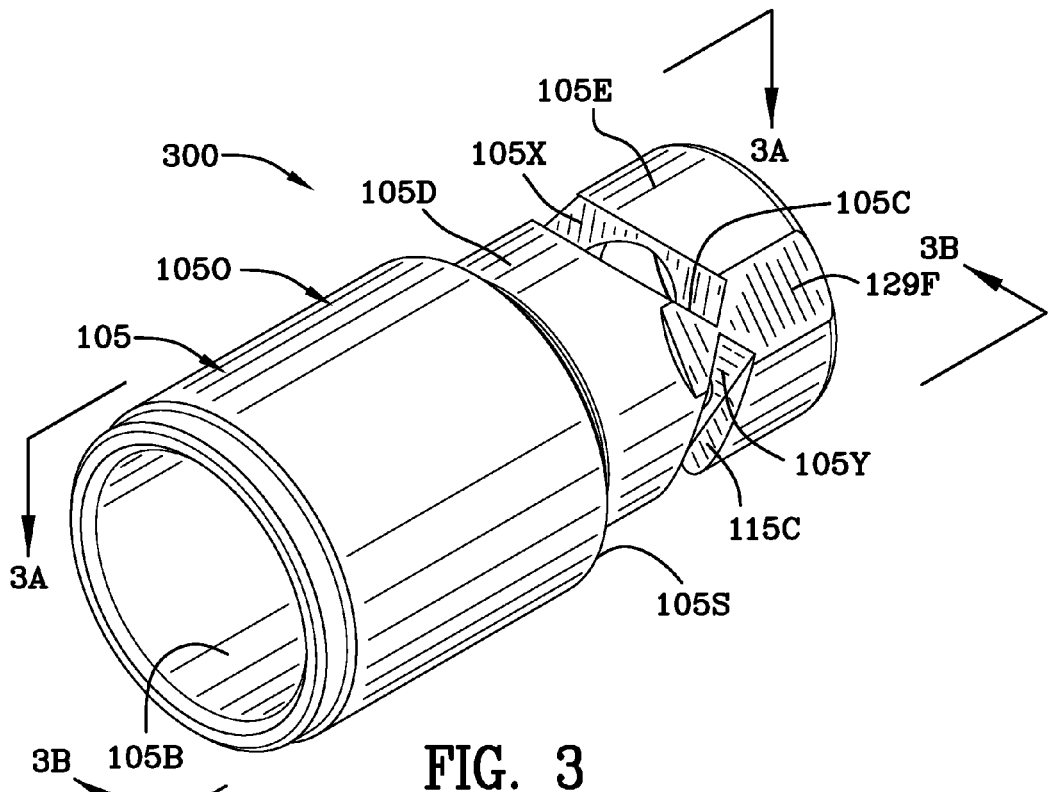
FIG. 3 is a perspective view of the body of the female coupling half.

FIGS. 2, 2A, 2B and 2C illustrate locking bars 104, 104A residing transversely with respect to the internal longitudinal bore 105B. Internal longitudinal bore 105B is illustrated in FIG. 3.

Cam 118 slidingly engages the end portion 105E of body 105 and cam 118 also slidingly engages the locking bars 104, 104A, and 104B. As stated previously, the cam 118 is movable between first and second positions. In the first position as illustrated when the coupling is fully coupled, for instance, in FIG. 2C, cam 118 permits the locking ring 117, urged by spring 114, to force the plurality of locking bars 104, 104A, 104B into their respective groove 105C, 115C, 125C in the body 105 extending the locking bars 104, 104A, 104B into the internal longitudinal bore 105B of the body 105. Locking bars 104, 104A, 104B are in their first position, the locked position, as illustrated in FIG. 2C. Referring to FIG. 3B, groove 105C is limited by stop 105X such that intermediate portion 504 of the locking bar 104 cannot travel too far into internal longitudinal bore 105B of the body. In the second position, in FIGS. 6A, 7, 7A, 7B and 7C, cam 118 urges locking bars 104, 104A, 104B toward the exterior of the body 105D and out of the internal longitudinal bore 105B against locking ring 117 compressing spring 114. Locking bars 104, 104A, 104B are in their second positions as illustrated in FIGS. 6A, 7, 7A, 7B and 7C. Male coupling half 180 is secured by locking bars 104, 104A, 104B in their first positions when cam 118 is in the first position as illustrated in FIGS. 1A and 2C.

An outer sleeve 111 slidingly engages the exterior 105O of the body 105 and positions cam 118 in the second position against the force of the spring 114 when desired to permit uncoupling of the male coupling half 170 and female coupling half 180. Each of the locking bars includes a first cylindrical end 161, a second cylindrical end 162, and a substantially square, in cross-section, intermediate portion residing between the first and second cylindrical ends. Referring to FIG. 5D, locking bar 104 is illustrated with first cylindrical end 161, second cylindrical end 162, and substantially square, in cross-section, intermediate portion 504.

The cam 118 engages the first and second cylindrical end portions of the locking bars. The substantially square, in cross-section, intermediate portions of the locking bars 104, 104A, 104B include an arcuate retaining surface 104S which engages a reciprocally shaped portion (surface 185, FIG. 9) of the male coupling half 180 during coupling. Further, the substantially square, in cross-section, intermediate portions of the locking bars include a first arcuate wall 104P, a second arcuate wall 140Q, and an arcuate groove 104G residing between the first arcuate wall 104P and the second arcuate wall 104S. Arcuate groove 104G is sometimes referred to herein as a radius.

The substantially square, in cross-section, intermediate portions include an engagement side 104E having a first face 104F and a second face 104J. The first arcuate wall extends from the first face of the substantially square, in cross-section, intermediate portion to the arcuate groove. The second arcuate wall extends from the second face 104J of the substantially square, in cross-section, portion to the arcuate groove. The arcuate retaining surface 104S is formed in the second face 104J of the substantially square, in cross-section, intermediate portion and grips the male coupling half during coupling.

Each of the locking bars includes a first cylindrical portion terminating in a first end surface 161E. Each of the locking bars includes a second 162 cylindrical portion terminating in a second end surface 162E. Each of the locking bars includes a substantially square, in cross-section, intermediate portion 504. Each of the intermediate portions reside between the first cylindrical portion 161 and the second cylindrical portion 162 of the end portions of the locking bar.

Figure 5E:
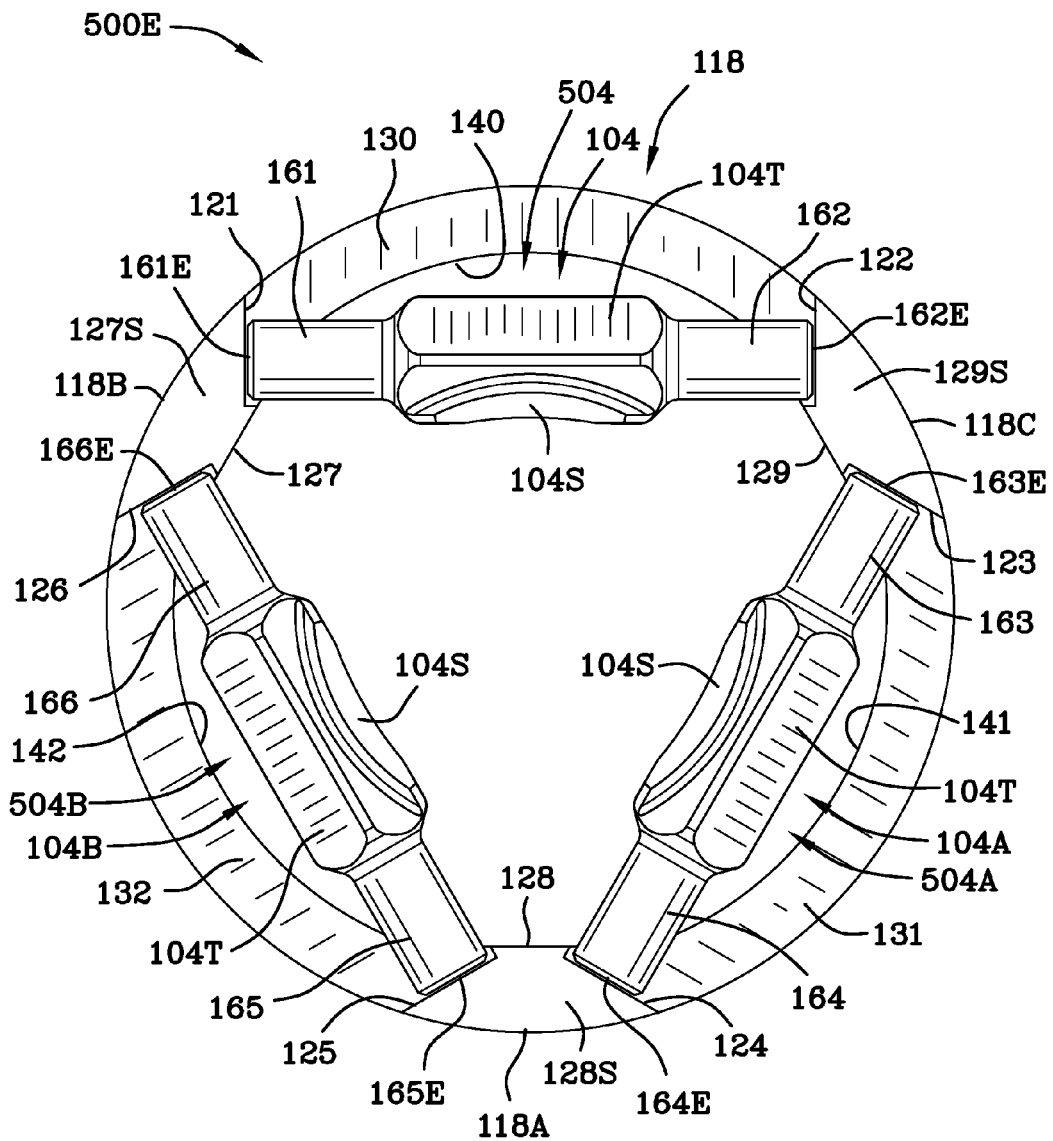
FIG. 5E is and end view of the cam and the locking bars illustrating the retaining surfaces of each of the locking bars.
Figure 5F:
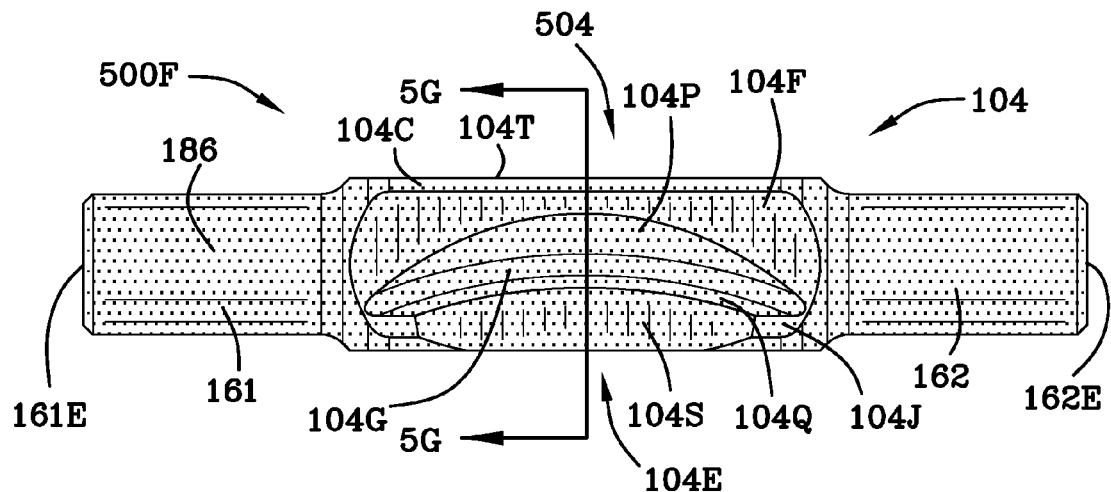
FIG. 5F is a view similar to FIG. 5A with a coating over the locking bar.
Figure 5G:
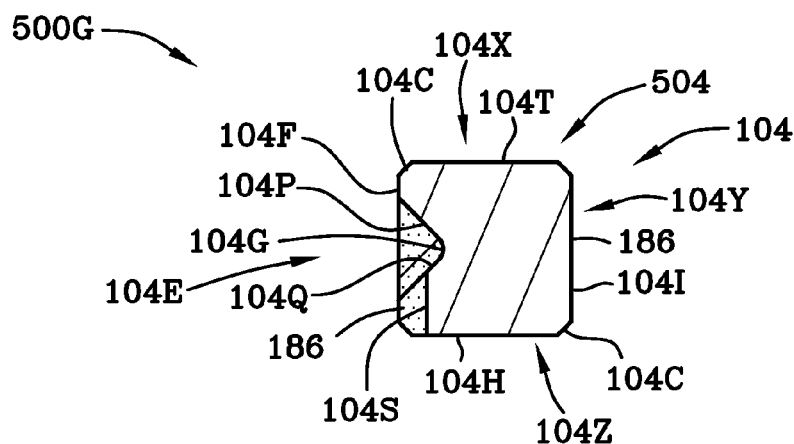
FIG. 5G is a cross-sectional view taken along the lines 5G-5G of FIG. 5F illustrating the coating on the exterior of the locking bar as a relatively dark line.

Referring to FIGS. 5D and 5E, first locking bar 104 includes a first cylindrical portion 161 terminating in a first end surface 161E. First locking bar 104 includes a second cylindrical portion 162 terminating in a second end surface 162E. First locking bar 104 further includes a substantially square, in cross-section, intermediate portion 504. The intermediate portion 504 resides between the first end cylindrical portion 161 and the second cylindrical portion 162.

Second locking bar 104A includes a first cylindrical portion 163 terminating in a first end surface 163E. Second locking bar 104A includes a second cylindrical portion 164 terminating in a second end surface 164E. Second locking bar 104A further includes a substantially square, in cross-section, intermediate portion 504A. The intermediate portion 504A resides between the first end cylindrical portion 163E and the second cylindrical portion 164E.

Third locking bar 104B includes a first cylindrical portion 165 terminating in a first end surface 165E. Third locking bar 104B includes a second cylindrical portion 166 terminating in a second end surface 166E. Third locking bar 104B further includes a substantially square, in cross-section, intermediate portion 504B. The intermediate portion 504B resides between the first end cylindrical portion 165 and the second cylindrical portion 166.

Cam 118 is generally cylindrically shaped and includes an inner surface 140, 141 and 142. Preferably, cam 118 includes a first post 118A, a second post 118B and a third post 118C. The inner portions 128, 127, 129 of the posts 118A, 118B, 118C are flat. The remainder of the inner surface includes arcs 140, 141, 142. Reference numeral 140 is the interior surface of cam 118 between posts 118B and 118C for locking bar 104. Reference numeral 141 is the interior surface of cam 118 between posts 118C and 118A for locking bar 104A. Reference numeral 142 is the interior surface of cam 118 between posts 118A and 118B for locking bar 104B. Post 118A includes inner flat portion 128. Post 118B includes inner flat portion 127. And, post 118C includes inner flat portion 129. See, FIGS. 5D and 5E. FIG. 5D is a perspective view 500D of the cam 118 and the locking bars 104, 104A and 104B. FIG. 5E is an end view 500E of the cam 118 and the locking bars 104, 104A, and 104B.

The flat inner portions 128, 127, 129 of the cam 118 reside adjacent flat portions 128F, 127F and 129F on the exterior 105E of the body 105 of the female coupling half. The flat inner portions of the cam and the body 105 of the female coupling half prevent rotation of the cam with respect to the body. The cam 118 is keyed to the body 105 and prevents rotation of the cam with respect to the body 105.

FIG. 3 is a perspective view 300 of the body 105 of the female coupling half 170. Internal longitudinal bore 105B is illustrated in FIGS. 3 and 3C. Grooves 105C, 115C are illustrated in FIG. 3. End portion 105E is shown and it is this portion over which the cam 118 resides and slides from the first position to the second position. The first position of cam 118 is illustrated in FIGS. 1A, 2, 2A, 2B, 2C and 8A. The second position of the cam 118 is illustrated in FIGS. 6A, 7, 7A, 7B and 7C. Reference numeral 105D illustrates the intermediate portion of the body 105. Spring 114 resides about the intermediate portion 105D of the body 105 as illustrated in FIGS. 1A, 2C, 6A, 7C (and others). Stepped internal longitudinal bore 105B is illustrated in FIGS. 3 and 3C. Shoulder 105S supports spring 114 viewed in FIG. 1A. Body 105 includes an exterior denoted by reference numeral 105O. Raised diametrical portion 105A secures spring 114 about body 105. Body 105 includes face 105F illustrated in FIGS. 1A, 3A, and 6A (and others).

Figure 3A:
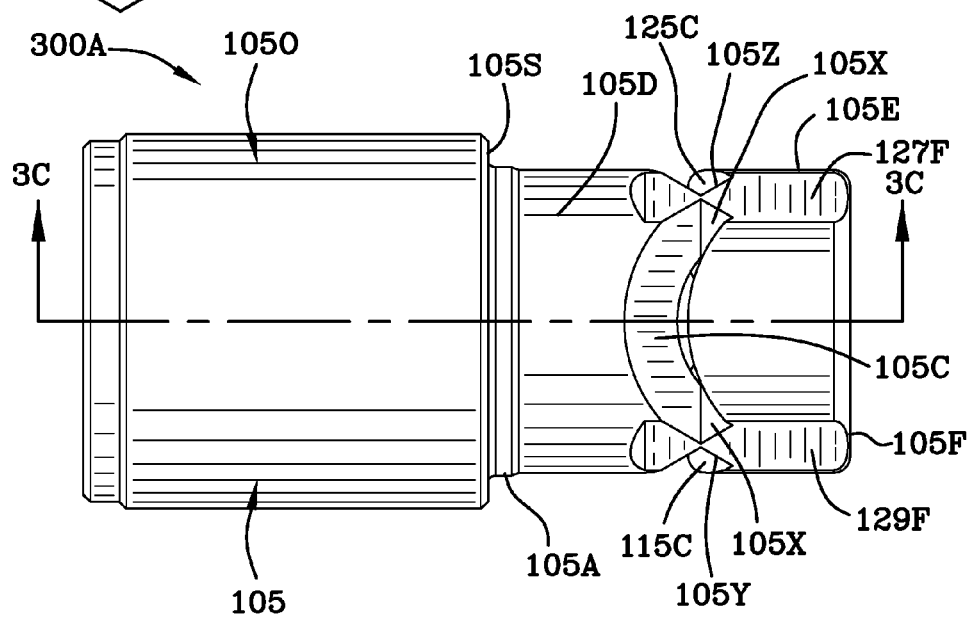
FIG. 3A is a top view of the body of the female coupling half.
Figure 3B:
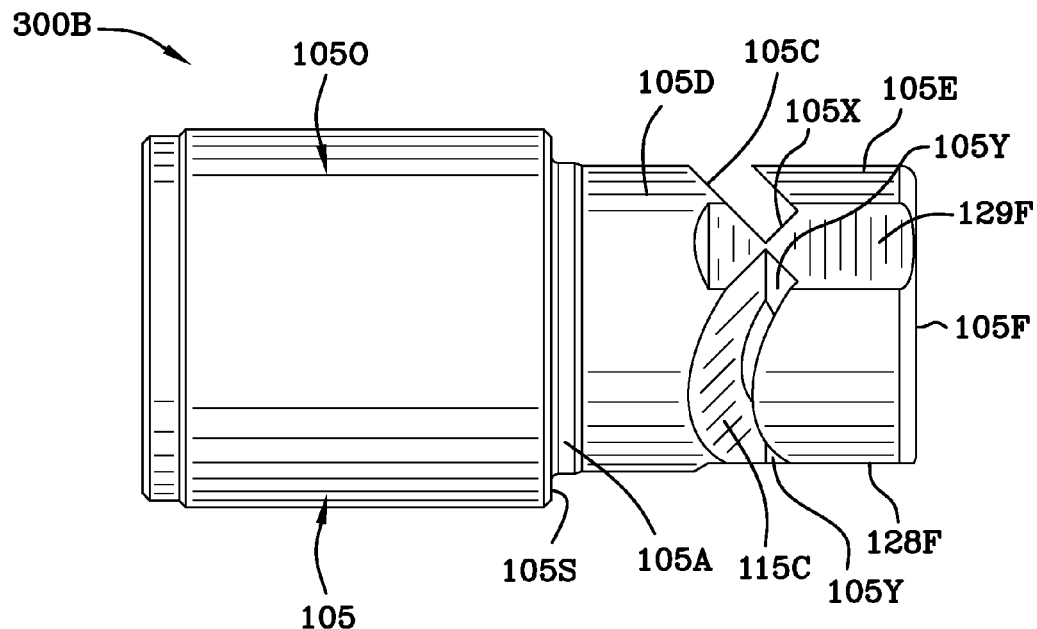
FIG. 3B is a right side view of the body of the female coupling half as illustrated in FIG. 3B.
Figure 3C:
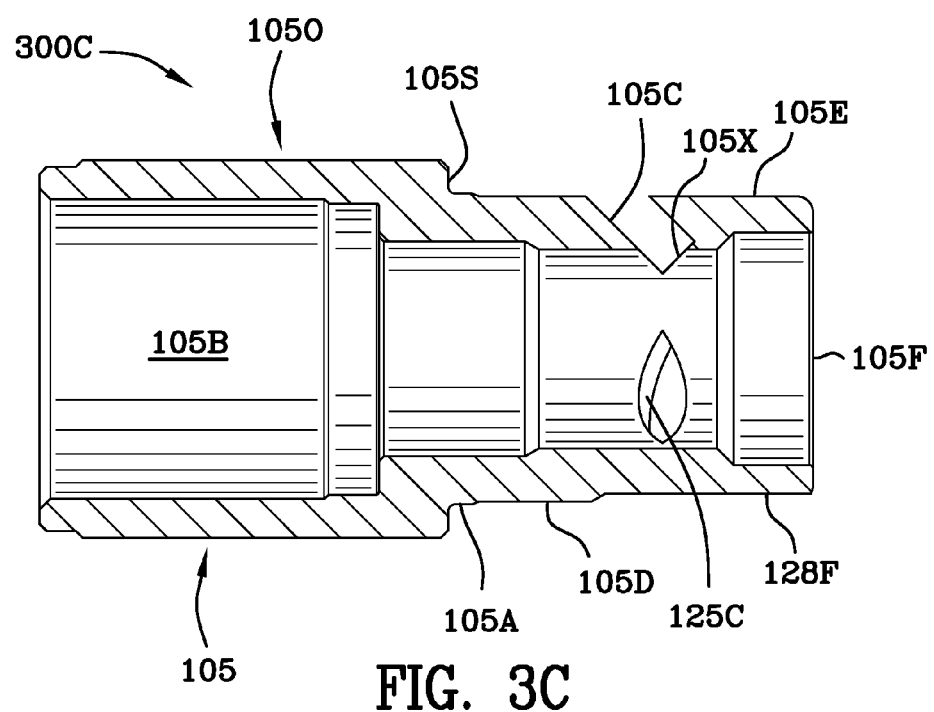
FIG. 3C is a cross-sectional view of the body of the female coupling half taken along the lines 3C-3C of FIG. 3A.

FIG. 3A is a top view 300A of the body 105 of the female coupling half 170 illustrating flat surfaces 127F, 129F and grooves 105C, 115C and 125C. Flat surfaces 127F, 129F are illustrated as extending longitudinally along the intermediate section 105E of the body 105. One method for controlling travel of the cam 118, is to employ flat surfaces 127F, 129F which limit the longitudinal movement of the cam 118. Ordinarily, the cam 118 does not move the full extent of the flat surfaces 127F, 129F as the locking bars are extracted from the internal longitudinal bore 105B before the cam slides the full extent of the flat surfaces 127F, 129F. It is not possible for the flat surfaces 127, 128, 129 of the cam to extend past the flat surfaces 127F, 128F of body 105.

FIG. 3B is a right side view 300B of the body of the female coupling half 170 as illustrated in FIG. 3B illustrating groove 105C well and flat portion 129F on the exterior of body end portion 105E. Groove 105C extends to a stop 105X which prohibits the further extension of locking bar 104 into the internal longitudinal bore 105B of body 105. Flat portion 128F is illustrated on the end portion 105E of body 105. FIG. 3C is a cross-sectional view 300C of the body of the female coupling half taken along the lines 3C-3C of FIG. 3A illustrating the stepped bore 105B.

Referring to FIGS. 4, 4B, 4C, 5D and 5E, each of the posts 118A, 118B, 118C of the cam 118 includes one locking bar end guide surface and another locking bar end guide surface. Post 118B includes end guide surface 121 for guiding end 161E of locking bar 104. Post 118C includes an end guide surface 122 for guiding end 162E of locking bar 104. See FIGS. 4, 4B, 4C and 5E. Post 118C includes guide surface 123 for guiding end 163E of locking bar 104A. Post 118A includes end guide surface 124 guiding end 164E of locking bar 104A. Post 118A includes end guide surface 125 for guiding end 165E of locking bar 104B. And, post 118B includes end guide surface 126 for guiding end 166E of locking bar 104B.

Figure 4:
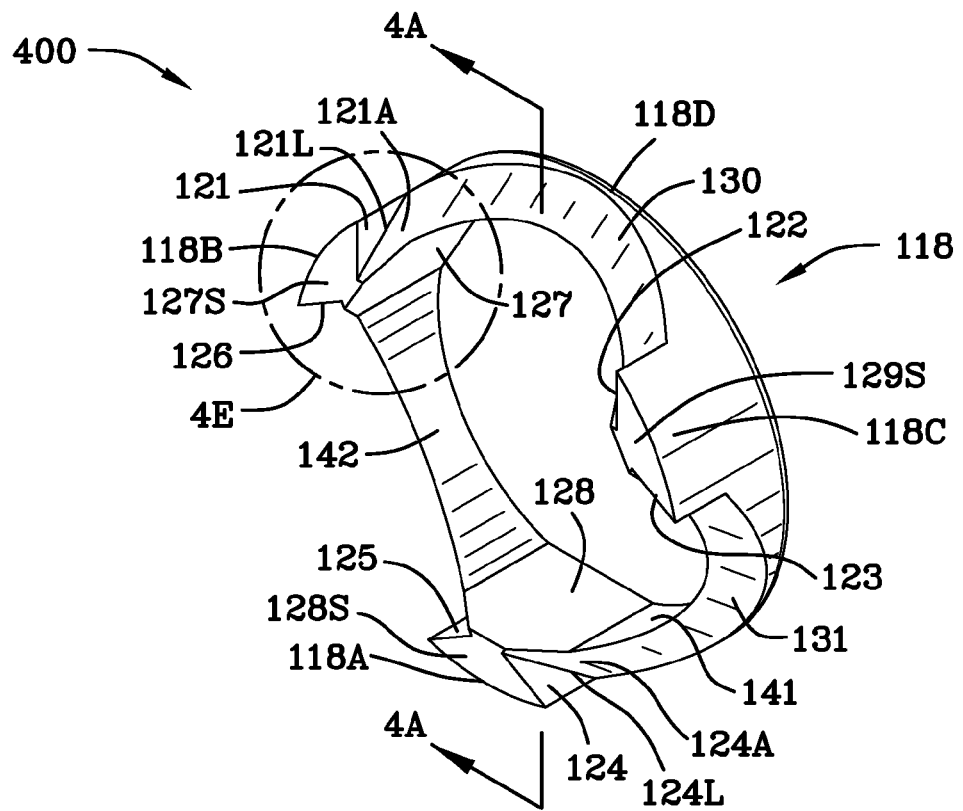
FIG. 4 is a perspective view of the cam.

FIG. 4 is a perspective view 400 of the cam 118 illustrating posts 118A, 118B, 118C. Posts 118A, 118B, 118C includes end surfaces 128S, 127S, and 129S, respectively. Cam 118 includes a first cam surface 130, a second cam surface 131 and a third cam surface 132. See FIG. 4C. Cam surface 130 of cam 118 resides between posts 118B and 118C and is used for moving locking bar 104 between first and second positions. Cam surface 131 of cam 118 resides between posts 118C and 118A and is used for moving locking bar 104A between first and second positions. Cam surface 132 of cam 118 resides between posts 118A and 118B and is used for moving locking bar 104B between first and second positions.

Figure 4A:
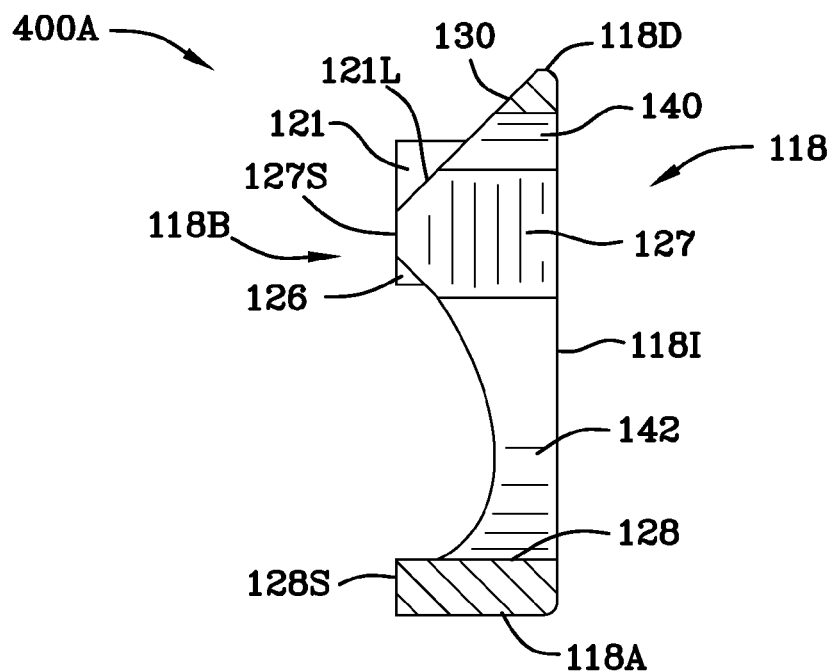
FIG. 4A is a cross sectional view of the cam taken along the lines 4A-4A of FIG. 4.

FIG. 4A is a cross sectional view 400A of the cam 118 taken along the lines 4A-4A of FIG. 4. FIGS. 4 and 4A illustrate a thin portion 118D of the cam 118 at the furthest outer extent of the cam 118. Further, post 118A is illustrated together with flat inner surface 128 thereof in FIGS. 4 and 4A.

Referring to FIGS. 1A, 4 and 4A, surface 118I of cam 118 engages the inner shoulder 111S of sleeve 111. It will also be noticed that the same profile, in cross-section of cam 118 is illustrated in FIGS. 1A and 4A. End guide surface 121 of post 118B for guiding end 161E of locking bar 104 is illustrated well in FIGS. 4 and 4E. FIG. 4E is an enlargement 400E of a portion of FIG. 4. Reference numeral 121A indicates a portion of cam surface 130 surface near line 121L. Line 121L is formed at the intersection of the cam surface 130 and the end guide surface 121. Similarly, line 124L is formed at the intersection of cam surface 131 and end guide surface 124. Reference numeral 124A indicates a portion of the cam surface 131 near line 124L. FIGS. 5D and 5E illustrate the locking bars 104, 104A and 104 B positioned between respective end guides and the cylindrical portions thereof engaging the cam surfaces 130, 131 and 132.

Figure 4B:
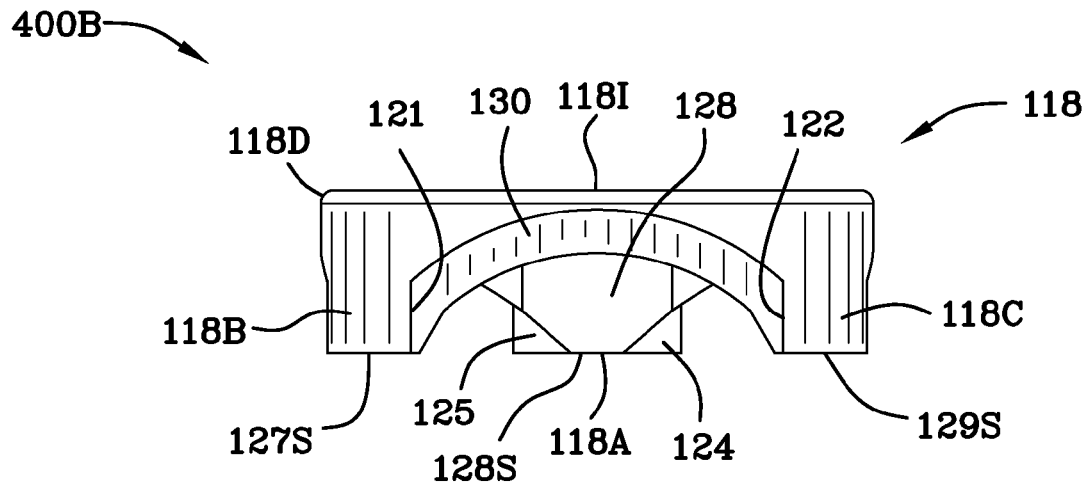
FIG. 4B is a top view of the cam illustrated in FIGS. 4 and 4A.
Figure 4C:
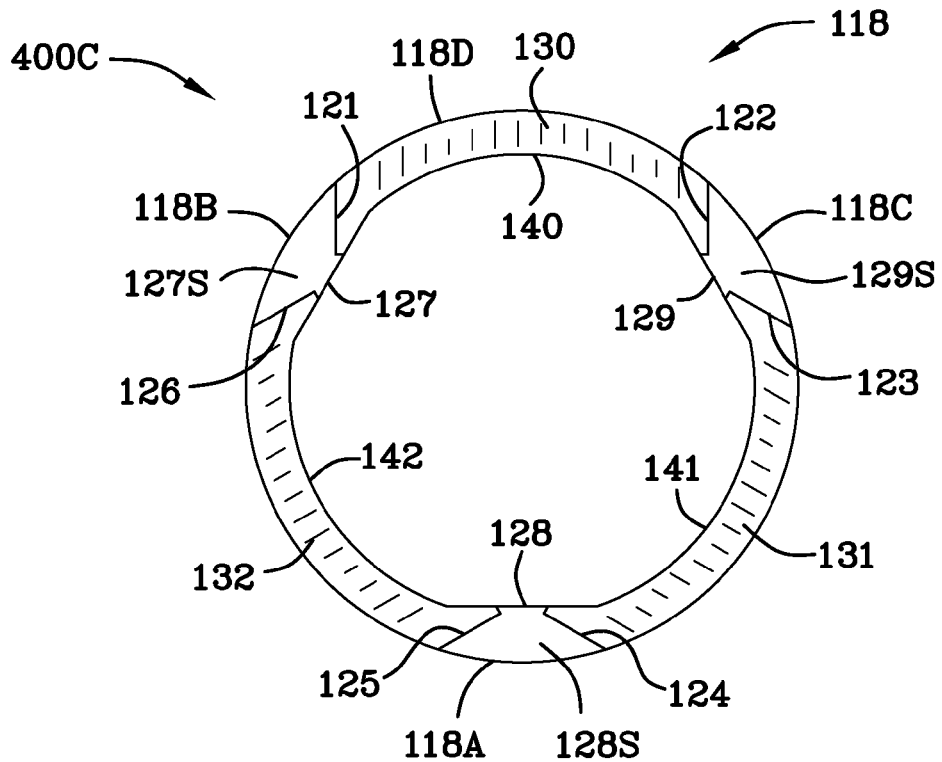
FIG. 4C is an end view of the cam illustrated in FIGS. 4A and 4B.
Figure 4D:
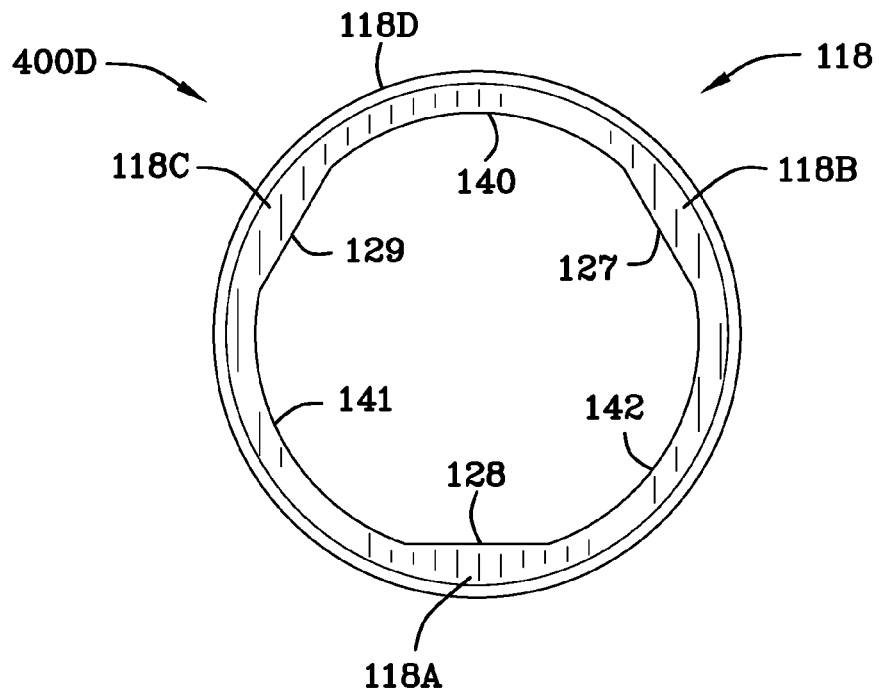
FIG. 4D is the opposite end view of the cam illustrated in FIG. 4C.
Figure 4E:
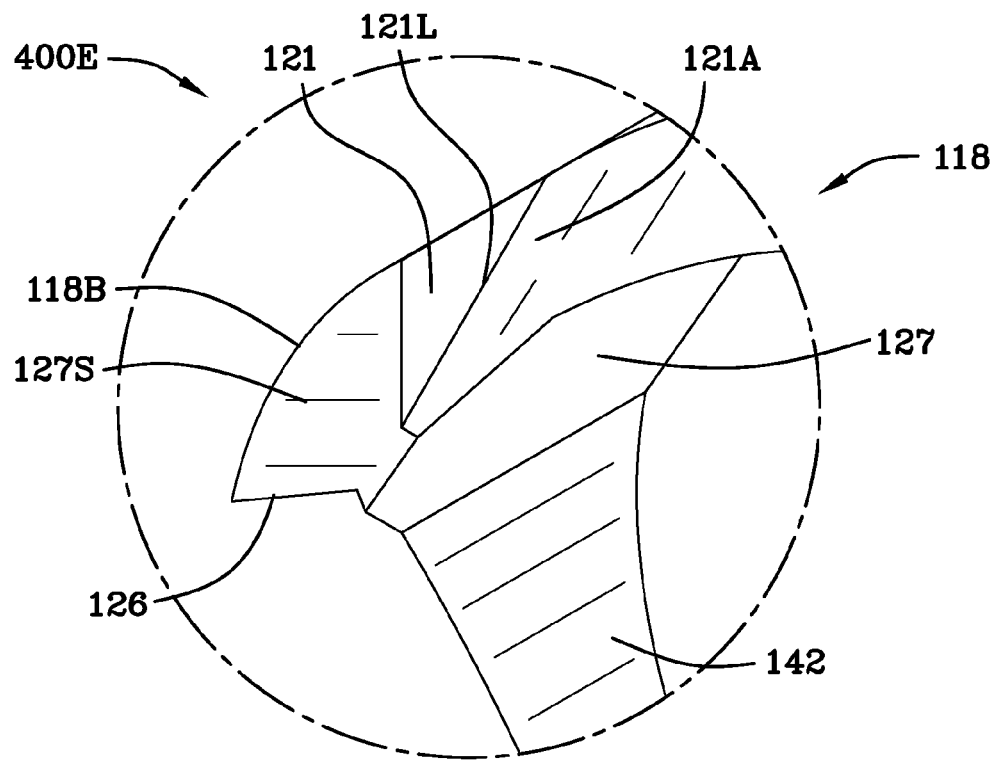
FIG. 4E is an enlargement of a portion of FIG. 4.

FIG. 4B is a top view 400B of the cam illustrated in FIGS. 4 and 4A. FIG. 4C is an end view 400C of the cam 118 illustrated in FIGS. 4A and 4B. FIG. 4D is the opposite end view 400D of the cam illustrated in FIG. 4C and shows flat surfaces 127, 128, 129 and arc shaped surfaces 140, 141, 142.

As illustrated in FIGS. 5D and 5E (and others), cylindrical end portions 161, 162 are guided by end guide surfaces 121, 122 along cam surface 130. End guide surfaces 121, 122 keep locking bar 104 in proper position and do not allow leftward or rightward movement of locking bar 104. Only cylindrical portions 161, 162 engage cam surface 130. Intermediate portion 504 of locking bar 104 does not engage cam surface 130. Locking bar 104 includes a substantially square, in cross-section, intermediate portion 504 which resides in groove 105C of body 105. Locking bars 104, 104A, 104B are movable between a first position when cam 118 is in the first position and a second position when cam 118 is in the second position. In first position, locking bars 104, 104A, 104B extend into grooves 105C, 115C, 125C, and abut stops 105X, 105Y, 105Z. See FIG. 3A. When cam 118 is in the first position, the coupling is locked as illustrated in FIGS. 1A and 2C (and others). Further, when cam 118 is in the first position, the female coupling half may be disconnected as illustrated in FIG. 8A. When cam 118 is in the second position, the coupling is unlocked as illustrated in FIGS. 6A and 7C (and others).

As illustrated in FIGS. 5D and 5E (and others), cylindrical end portions 163, 164 are guided by end guide surfaces 123, 124 along cam surface 131. End guide surfaces 123, 124 keep locking bar 104A in proper position and do not allow leftward or rightward movement of the locking bar 104A. Only cylindrical portions 165, 166 engage cam surface 131. The intermediate portion 504A of locking bar 104A does not engage cam surface 131. Locking bar 104A includes a substantially square, in cross-section, intermediate portion 504A which resides in groove 115C of body 105.

As illustrated in FIGS. 5D and 5E (and others), cylindrical end portions 165, 166 are guided by end guide surfaces 125, 126 along cam surface 132. End guide surfaces 125, 126 keep locking bar 104B in proper position and do not allow leftward or rightward movement of locking bar 104B. Only cylindrical portions 165, 166 engage cam surface 132. The intermediate portion 504B of locking bar 104B does not engage cam surface 132. Locking bar 104B includes a substantially square, in cross-section, intermediate portion 504B which resides in groove 125C of body 105.

Figure 6A:
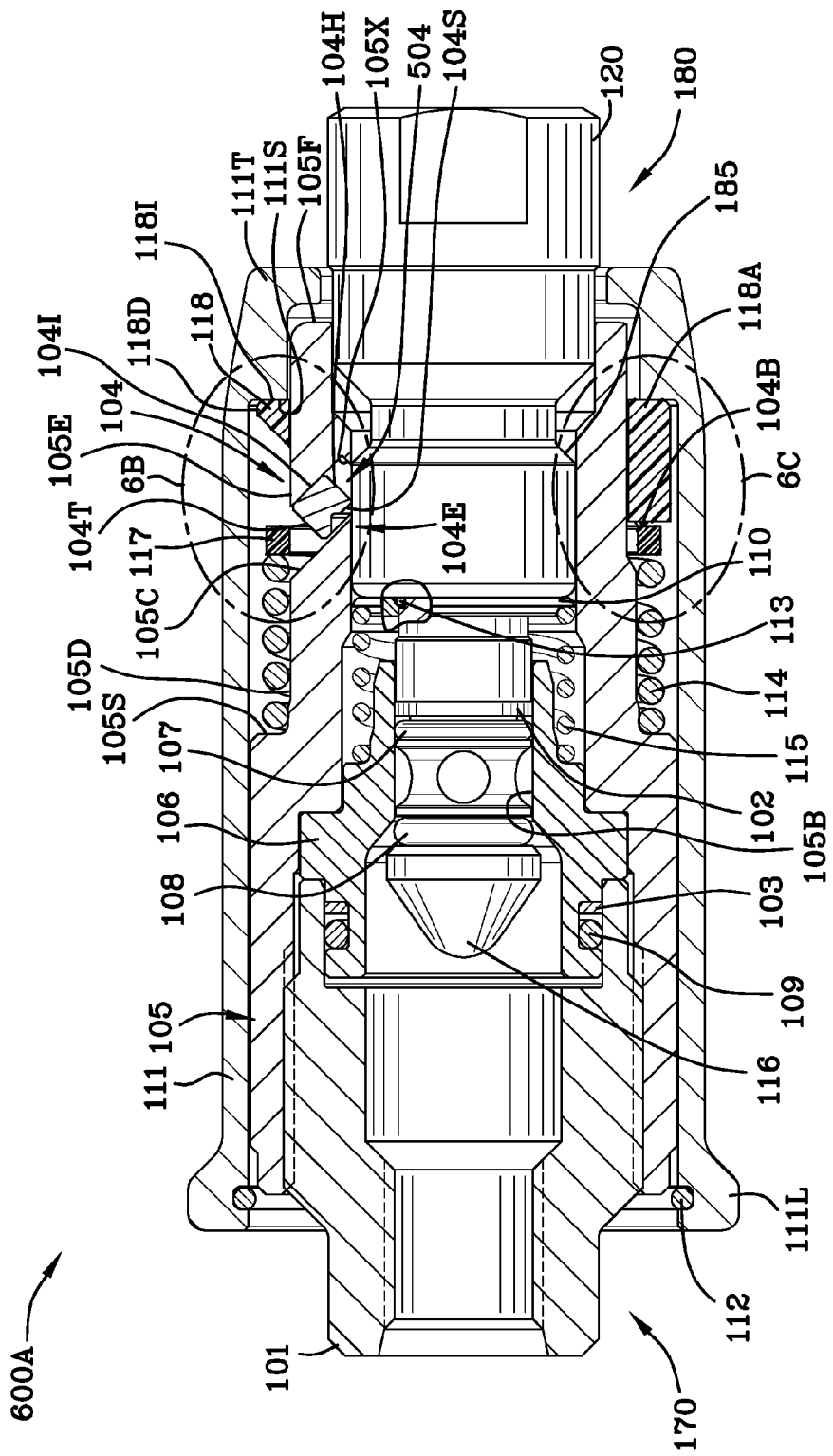
FIG. 6A is a cross-sectional view of the coupling taken along the lines 6A-6A of FIG. 6.

FIG. 6 is a plan view 600 of the coupling in the process of being connected/disconnected. FIG. 6A is a cross-sectional view 600A of the coupling taken along the lines 6A-6A of FIG. 6 in the process of being connected/disconnected. FIG. 6A illustrates sleeve 111 retracted leftwardly such that cam 118 is positioned leftwardly in its second position and is performing a camming or wedging action on locking bars 104, 104A, 104B extracting them from their respective grooves 105C, 115C, 125C and moving them from their first, locked, position of FIG. 1A to their second, unlocked/disconnected, position of FIG. 6A. FIG. 6A illustrates the sleeve retracted and the snap ring 112 housed within the sleeve 111 moved leftwardly. Further, FIG. 6A illustrates locking ring 117 compressing spring 114 under the influence of force applied to the sleeve 111 in the leftward direction. As locking ring 117 is moved leftwardly, the locking bars 104, 104A, 104B are extracted out of their respective grooves as viewed in FIG. 7. The examples shown herein depict three locking bars, however, any number of locking bars may be used.

Figure 6B:
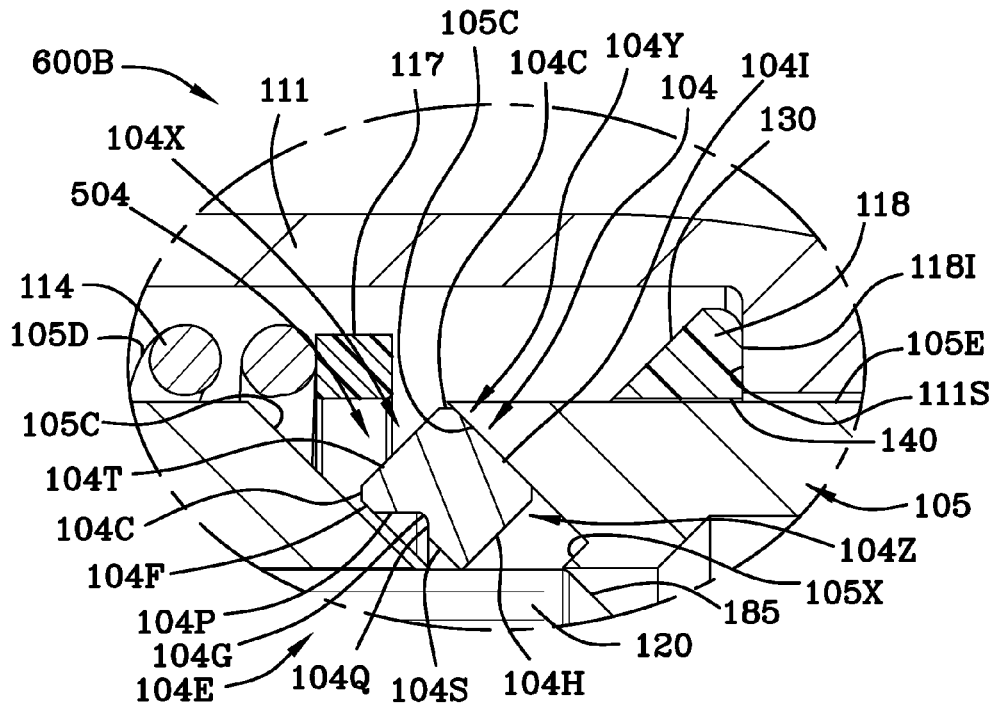
FIG. 6B is an enlargement of a portion of FIG. 6A.
Figure 6C:
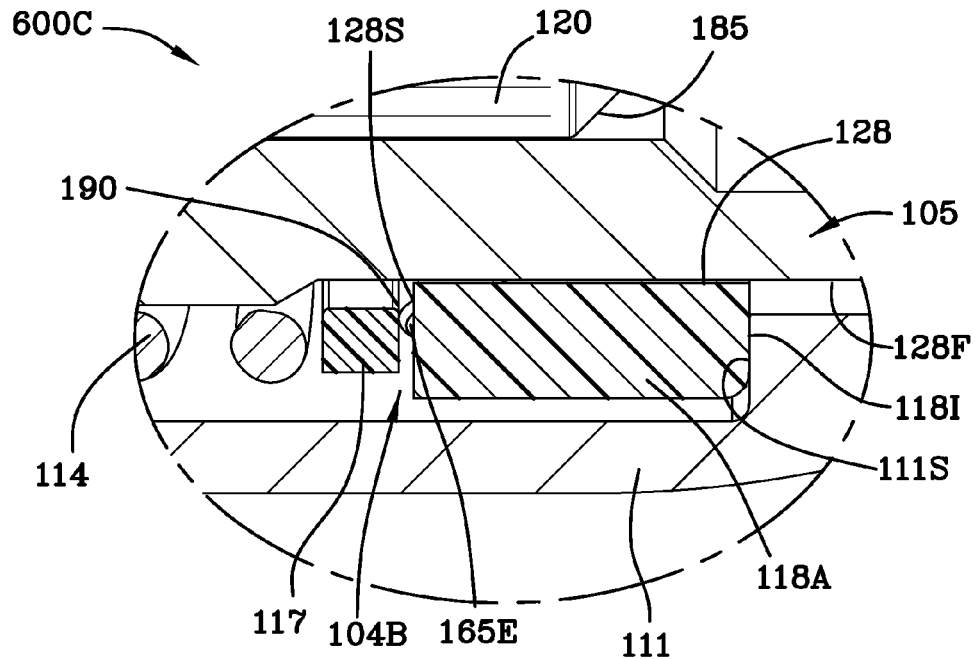
FIG. 6C is an enlargement of a portion of FIG. 6A.
Figure 7:
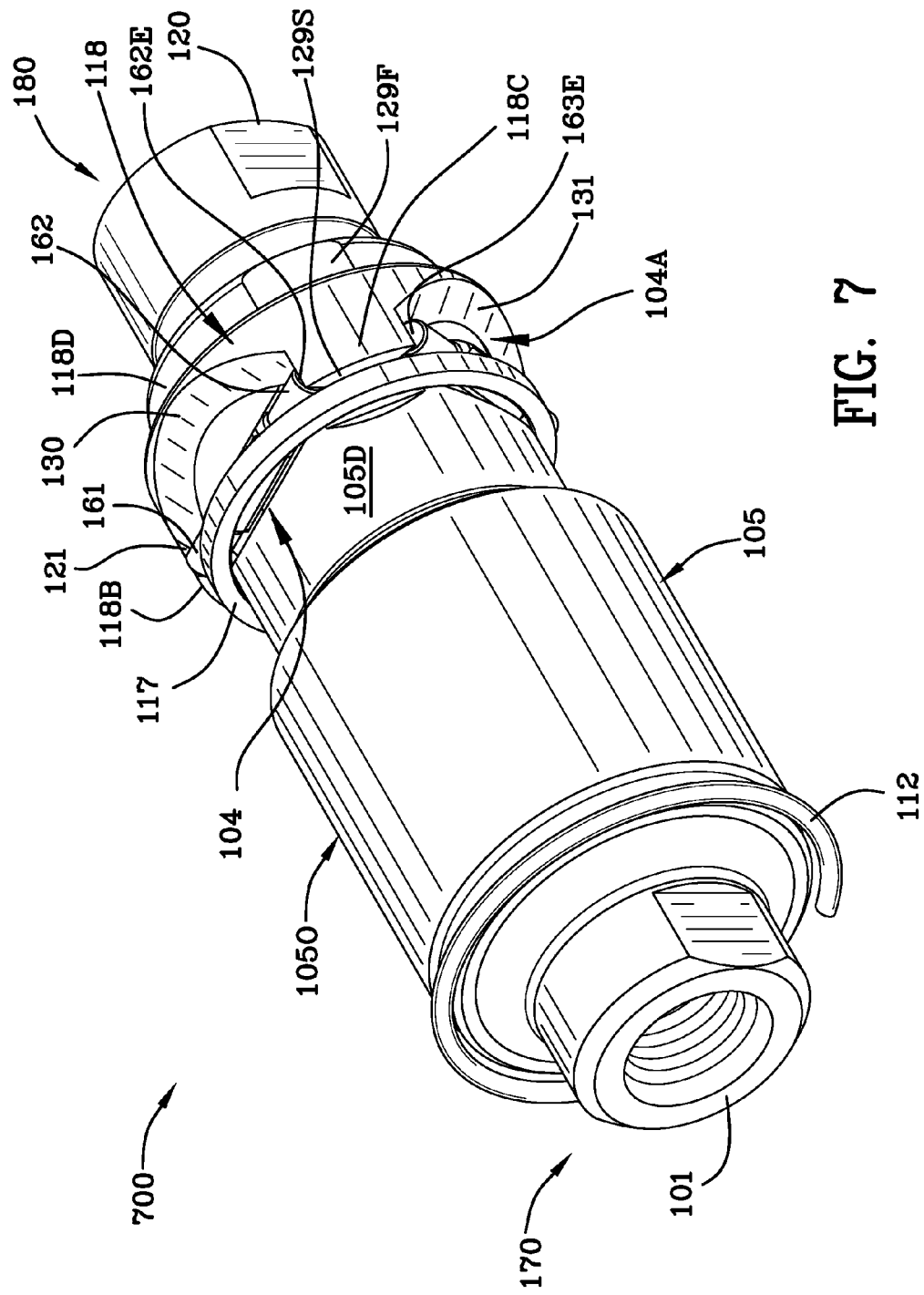
FIG. 7 is a perspective view of the body of the female coupling half in the process of being connected or disconnected from the male coupling half illustrating the cam and the locking ring without the sleeve and the spring.

FIG. 7 is a perspective view 700 of the body 105 of the female coupling half in the process of being connected/disconnected illustrating the cam 118, the locking ring 117, and the cam 118 without sleeve 111 and the spring 114 illustrated. Cam 118, locking ring 117, and sleeve 111 are in their second positions in FIGS. 6A, 6B, 6C and 7.

Cam 118, locking ring 117, and sleeve 111 are in their first positions in FIGS. 1A and 2. A comparison of FIGS. 2 and 7 is now described. FIG. 7 illustrates additional radially outward exposure of locking bars 104, 104A as the locking bars have been moved to their second position by cam 118 moving to its second position. Also see and compare FIGS. 2A and 7A. Referring to FIG. 6A, as bars 104, 104A, 104B are extracted from their respective grooves 105C, 115C, and 125C, spring 115 urges retainer 110 against male coupling half 180 expelling the male coupling half 180 rightwardly and out of internal longitudinal bore 105B of the female coupling half 170. Following expulsion of the male coupling half, leftward force on sleeve 111 when viewing FIG. 6A can be discontinued and spring 114 returns the locking ring 117, cam 118, and the locking bars 104, 104A, 104B to their first positions as viewed in FIG. 8A.

When cam 118, locking ring 117, and locking bars are in their first positions, the male coupling half may be inserted into the internal longitudinal bore 105B of the female coupling half under force and the male and female coupling halves may be joined without retracting sleeve 111 leftwardly. When the coupling is in use, the female half (supply half) is actually pushed onto the male half (receiving half located on the automobile). In a natural gas vehicle application, the male coupling half is permanently mounted on a car and the female half is the supply half for supplying natural gas to the vehicle's tank. Alternatively, the male and female coupling halves may be coupled together by holding the female coupling in place and forcefully inserting the male coupling half therein. Holding one coupling half fixed is known as a push-to-connect coupling. As the coupling halves are in the process of being connected, and movement of the cam 118, the locking ring 117, and the locking bars 104, 104A, 104B to their respective second positions occurs, the male coupling half still must overcome the force of spring 115 to allow insertion of the male coupling half to a point where male coupling half mating surface 185 is within engagement side 104E of the locking bars 104, 104A, 104B.

When the cam 118 is in the first position as illustrated in FIG. 1A, spring 114 is compressed in a first position or state between locking ring 117 and shoulder 105S on the body 105 and the spring state is referred to as the first position, extended. When the cam 118 is in the second position as illustrated in FIG. 6A and is further compressed in a second position or state between locking ring 117 and shoulder 105S on the body 105 and the spring state is referred to as the second position, compressed.

The following tables enable a better understanding of the operation of the coupling halves.

TABLE 1

Push to connect, initially disconnected state

| coupling state | cam 118 position | locking ring 117 position | spring 114 position | locking bars 104, 104A, 104B position |
|---|---|---|---|---|
| Disconnected as illustrated in FIG. 8A | first position, not forcefully engaging locking bars | first position, extended | First position, extended | first position, partially in internal longitudinal bore |
| partially connected/ disconnected as illustrated in FIG. 6A | first position, not forcefully engaging locking bars | second position, retracted | second position, compressed | second position, extracted from internal longitudinal bore |
| fully connected as illustrated in FIG. 1A | first position, not forcefully engaging locking bars | first position, extended | first position, extended | first position, partially in internal longitudinal bore |

TABLE 2

Release from the fully connected state

| coupling state | cam position | locking ring position | spring | locking bar position |
|---|---|---|---|---|
| connected before cam actuation | second position, cam forcefully engaging the locking bars | second position, retracted | second position, compressed | second position, extracted from internal longitudinal bore |

FIG. 6B is an enlargement 600B of a portion of FIG. 6A illustrating movement of the intermediate portion 504 of locking bar 104 to the second position allowing spring 115 to push cylindrical surface 181 past the intermediate portion 504. See FIG. 9. FIG. 6B illustrates the engagement side 104E moved to the second position such that arcuate surface 104S does not restrict surfaces 181, 185 of the male body in any way enabling extraction of the male coupling half 180 from the female coupling half 170.

FIG. 6C is an enlargement 600C of a portion of FIG. 6A illustrating post 118A and cam 118 in the second position and illustrating locking bar 104B in its second position. Contact 190 between locking ring 117 and locking bar 104B is also illustrated in FIG. 6C.

Figure 7A:
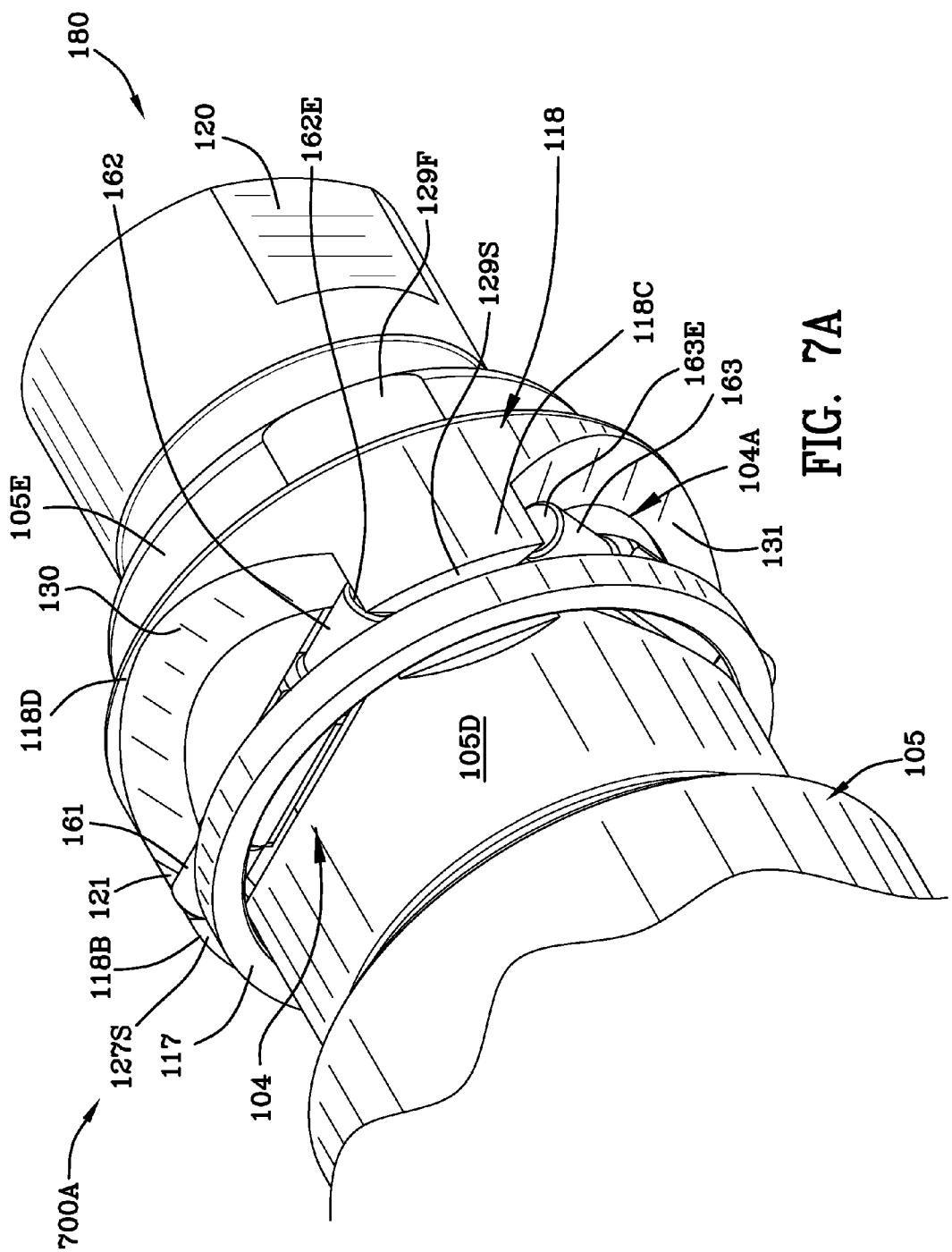
FIG. 7A is an enlargement of a portion of FIG. 7.
Figure 7B:
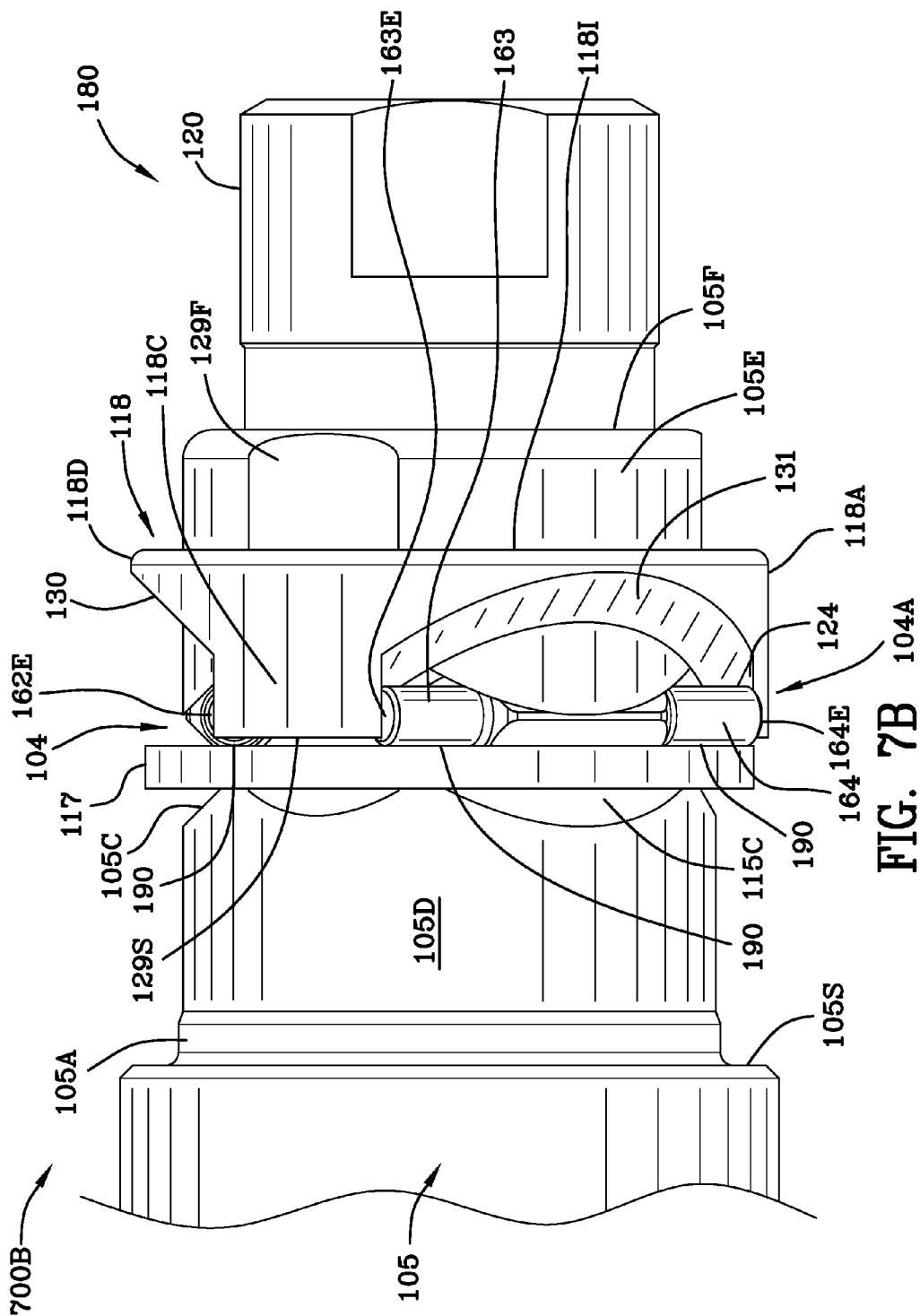
FIG. 7B is a side view of FIG. 7A illustrating the locking ring in engagement with the locking bars.

FIG. 7A is an enlargement 700A of a portion of FIG. 7 illustrating locking bars 104, 104A in their second outward positions. Cam 118 and locking ring 117 are in their second positions as well in FIG. 7A. Post 118C of cam (having a flat inner surface) is positioned near the leftward end of flat surface 129F of body 105. As illustrated in FIG. 7A, the cylindrical portions 161, 162 of locking bar 104 are illustrated as being extracted along cam surface 130 to the second position. As cam 118 moves leftwardly the locking bars move outwardly. Similarly, cylindrical portion 163 of locking bar 104A is illustrated as being extracted along cam surface 131 to the second position. Essentially, cam 118 scoops the locking bars 104, 104A, 104B out of the grooves 105C, 115C and 125C as the cam is moved to its second position. FIG. 7B is a side view 700B of FIG. 7A illustrating the locking ring 117 in engagement 190 with the locking bars 104, 104A.

It should be noted that when the male coupling half and the female coupling half are fully coupled, that fluid/gas flow therethrough is permitted. Male coupling half 180 includes a check valve therein which permits flow from the female coupling half to the male coupling half.

FIG. 7B illustrates the cam angle of cam surface 130 being approximately 90° with respect to the angle of groove 105C, Similarly, the cam angle of cam surfaces 131, 132 are approximately 90° with respect to the angle of grooves 115C, 125C. FIG. 7C is an enlarged side view 700C of FIG. 7B together with the spring 114 operable between shoulder 105S on the body 105 and the ring 117. In the second position of locking ring 117 and cam 118, locking ring 117 engages 190 the cylindrical portions of locking bars 104, 104A, 104B. FIG. 7C illustrates the camming/wedging action of locking bar 104A with respect to cam surface 131. Locking bar 104A is in its second position extracted of the internal longitudinal bore of the body as illustrated in FIG. 7C. FIG. 7C also illustrates the locking ring 117 in its second position with spring 114 being compressed. Spring 114 is always compressed to some extend.

REFERENCE NUMERALS

100—plan view of coupling/female coupling half fully coupled
100A—cross sectional view of the coupling/female coupling half fully coupled
100B—enlargement of a portion of FIG. 1A
100C—enlargement of a portion of FIG. 1A
101—adaptor
102—PTFE back up ring on valve
103—PTFE back up ring between valve guide 106 and adaptor 101

104, 104A, 104B—locking bar
104C—chamfered corners of locking bars
104E—arrow indicating engagement side of the locking bar
104F—first face of the engagement side of the locking bars
104G—groove extending in a partial arc
104H—fourth surface of the locking bar opposite the second surface (top surface) of the locking bar
104I—third surface of locking bar opposite engagement side 104E which engages groove 105C
104J—second face of the engagement side of the locking bars
104P—first wall extending from the surface 104F of the locking bar to groove 104G
104Q—second wall extending from the retaining surface 104S to groove 104G
104S—second face of the engagement side of the locking bar that retains the male coupling half
104T—second surface of the locking bar
104X—arrow indicating second side of the locking bar
104Y—arrow indicating third side of the locking bar
104Z—arrow indicating fourth side of the locking bar
105—arrow indicating body of female coupling half 170
105A—raised circumferential ridge adjacent shoulder
105B—internal longitudinal bore of the body
105C, 115C, 125C—grooves in body 105 of the female coupling half 170 in which the locking bars 104, 104A, 104B respectively reside
105D—intermediate portion of the body 105
105F—face of the body
105S—shoulder on the body 105
105E—end of body 105
105O—exterior of body 105
105X—groove stop for groove 105C
105Y—groove stop for groove 115C
105Z—groove stop for groove 125C
106—valve guide
107—O-ring seal
108—O-ring seal
109—seal
110—retainer
111—sleeve
111L—shoulder of sleeve 111
111S—inner shoulder of sleeve 111
111T—tapered end portion of sleeve 111
112—snap-ring carried in interior of sleeve 111
113—snap-ring securing retainer 110 to valve 116
114—sleeve spring
115—valve spring
116—flow valve
117—locking ring
118—arrow pointing to cam
118A, 118B, 118C—posts of cam 118
118D—thin portions of cam 118
118I—surface of cam which engages the inner shoulder 111S of sleeve 111
120—end of male coupling half
121—end guide surface of cam 118 for guiding end 161E of locking bar 104
121A—portion of surface near line 121L
121L—line formed between guide 121 and portion 121A of surface 130
122—end guide surface of cam 118 for guiding end 162E of locking bar 104
123—end guide surface of cam 118 for guiding end 163E of locking bar 104A
124—end guide surface of cam 118 for guiding end 164E of locking bar 104A
124A—portion of surface near line 124L
124L—line formed between guide 124 and portion 124A of surface 131
125—end guide surface of cam 118 for guiding end 165E of locking bar 104B
126—end guide surface of cam 118 for guiding end 166E of locking bar 104B
127—flat surface on interior of post 118B
127S—end surface of post 118B of cam 118
128—flat surface on interior of post 118A
128S—end surface of post 118A of cam 118
127F, 128F, 129F—flat surfaces on body 105 mating with surfaces 127, 128, 129 on interior of posts 118A, 118B and 118C
129S—end surface of post 118C of cam 118
130—cam surface of cam 118 between posts 118B and 118C for locking bar 104
131—cam surface of cam 118 between posts 118C and 118A for locking bar 104A
132—cam surface of cam 118 between posts 118A and 118B for locking bar 104B
140—interior surface of cam 118 between posts 118B and 118C
141—interior surface of cam 118 between posts 118A and 118C
142—interior surface of cam 118 between posts 118A and 118B
161, 162—cylindrical portions of locking bar 104
161E, 162E—ends of cylindrical portions 161, 162 of locking bar 104
163, 164—cylindrical portions of locking bar 104A
163E, 164E—ends of cylindrical portions 163, 164 of locking bar 104A
165, 166—cylindrical portions of locking bar 104B
165E, 166E—ends of cylindrical portions 165, 166 of locking bar 104B
170—female coupling half
180—male coupling half
182—groove of male coupling half
185—engaging surface of male coupling half
187—pockmarked/deformed portion of engaging surface caused by Brunelling
190—engagement of ring 117 with locking bar 104B
200—perspective view of the body of the coupling fully connected illustrating the cam 118, the ring 117, without spring 114
200A—enlargement of a portion of FIG. 2
200B—enlarged side view of FIG. 2 illustrating ring 117 engaging cylindrical portions 163, 164 of locking bar 104A
200C—enlarged side view similar to FIG. 2 with spring 114 illustrated operable between the body 105 and the locking ring 117
300—perspective view of the body 105 of the female coupling as illustrated in FIG. 3
300A—top view of the body 105 of the female coupling as illustrated in FIG. 3A
300B—right side view of the body 105 of the female coupling as illustrated in FIG. 3B
300C—cross-sectional view of the body 105 of the female coupling taken along the lines 3C-3C of FIG. 3A
400—perspective view of the cam 118 illustrated in FIG. 4
400A—cross sectional view of the cam 118 taken along the lines 4A-4A of FIG. 4
400B—top view of the cam 118 illustrated in FIG. 4B
400C—end view of the cam 118 illustrated in FIG. 4C
400D—opposite end view of the cam 118 illustrated in FIG. 4D 400E—enlargement of a portion of FIG. 4 illustrating post 118B, guide surface 121, and flat inner surface 127 of post 118B
500—perspective view of the locking bar 104 illustrating: the cylindrical portions 161, 162, chamfered corners 104C of the locking bars, first face of the locking bar 104F, a first wall extending to the groove 104G which extends in a partial arc; a second wall extending from the retaining surface 104S to groove 104G; and the top of the locking bar
500A—front view of one of the locking bars
500B—cross-sectional view taken along the lines 5B-5B
500C—bottom view of the locking bar
500D—perspective view of the cam member 118 and the locking bars 104, 104A and 104B
500E—end view of the cam member 118 and the locking bars 104, 104A and 104B
500F—view similar to FIG. 5A illustrating a coating applied to the locking bar
500G—view similar to FIG. 5B illustrating a coating applied to the locking bar
504—intermediate portion of locking bar 104
504A—intermediate portion of locking bar 104A
504B—intermediate portion of locking bar 104B
600—plan view of the coupling in the process of being connected/disconnected
600A—cross-sectional view of the coupling taken along the lines 6A-6A of FIG. 6.
600B—an enlargement of a portion of FIG. 6A
600C—an enlargement of a portion of FIG. 6A
700—perspective view of the coupling in the process of being connected/disconnected (uncoupled) without spring 114 and sleeve 111 shown, and with the cam 118 in the second position
700A—enlargement of a portion of FIG. 7
700B—side view of FIG. 7A illustrating ring 117 in engagement with locking bars 104, 104A and 104B
700C—side view of the coupling as illustrated in FIG. 7B with the cam 118 in the second position
800—plan view of female coupling half
800A—cross-sectional view of FIG. 8 taken along the lines 8A-8A
900—plan view of male coupling half
1000—plan view of the prior art male coupling half indicating deformation to surface 185 caused by Burnelling

The invention claimed is:
1. A coupling, comprising:
a female coupling half;
said female coupling half includes: a body having a longitudinal axis; a locking bar that extends transverse to said longitudinal axis of said body; a spring; a ring; and, a cam;
said body includes a groove, an exterior, and an internal longitudinal bore therethrough;
said groove extends from said exterior of said body to said internal longitudinal bore;
said locking bar having an intermediate portion movable in said groove and end portions at opposite ends of said intermediate portion;
said spring operable between said body and said ring;
said ring engages said locking bar;
said cam slidingly engages said body;
said cam slidingly engages said end portions of said locking bar externally of said body;
said cam movable between first and second positions;
said cam in said first position permitting said ring, urged by said spring, to force said locking bar into said groove of said body extending said locking bar into said internal longitudinal bore of said body; and,
said cam in said second position forcefully urging said locking bar toward said exterior of said body and out of said internal longitudinal bore against said ring compressing said spring.
2. A coupling as claimed in claim 1, further comprising:
a sleeve;
said sleeve slidingly engages said body and positions said cam in said second position against the force of said spring when desired to permit uncoupling said female coupling half from a male coupling half.
3. A coupling as claimed in claim 1 wherein said end portions are cylindrical and said intermediate portions is substantially square, in cross-section.
4. A coupling as claimed in claim 3 wherein said substantially square, in cross-section, intermediate portion of said locking bar includes an engagement side, and said engagement side includes an arcuate retaining surface.
5. A coupling as claimed in claim 4 wherein said engagement side of said substantially square, in cross-section, intermediate portion of said locking bar includes a first arcuate wall, a second arcuate wall, and an arcuate groove residing between said first arcuate wall and said second arcuate wall.
6. A coupling as claimed in claim 5, further comprising:
said engagement side includes a first face of said substantially square, in cross-section, intermediate portion;
said engagement side includes a second cut-away face of said substantially square, in cross-section, intermediate portion;
said first arcuate wall extends from said first face of said engagement side of said substantially square, in cross-section, intermediate portion to said arcuate groove;
said second arcuate wall extends from said second cut-away face of said engagement side of said substantially square, in cross-section, intermediate portion to said arcuate groove; and,
said arcuate retaining surface is formed in said second cut-away face of said engagement side of said substantially square, in cross-section, intermediate portion.
7. A coupling as claimed in claim 1 wherein:
one of the end portions of said locking bar includes a first cylindrical portion and a first end surface;
a second of the end portions of said locking bar includes a second cylindrical portion and a second end surface;
said cam is generally cylindrically shaped and includes an inner surface; said cam includes a first post and a second post;
said first post of said cam includes a locking bar first end guide surface;
said second post of said cam includes a locking bar second end guide surface;
said cam includes a cam surface between said locking bar first end guide surface of said first post of said cam and said locking bar second end guide surface of said second post of said cam;
said inner surface of said cam is keyed to said body preventing rotation of said cam with respect to said body;
said first end surface is guided by said locking bar first end guide surface of said first post of said cam;
said second end surface is guided by said locking bar second end guide surface of said second post of said cam;
said first cylindrical portion and said second cylindrical portion slidingly engages said cam surface as said cam moves between said first position and said second posi- tion of said cam urging said locking bar toward said exterior of said body and out of said internal longitudinal bore of said body.

8. A coupling as claimed in claim 1 wherein said ring and said cam are each made of metal or plastic.

9. A coupling as claimed in claim 1 wherein said coupling is push-to-connect.

10. A coupling as claimed in claim 1 wherein said locking bar is stainless steel.

11. A coupling as claimed in claim 10 wherein said locking bar is coated with a coating.

12. A coupling, comprising:
a female coupling half;
said female coupling half includes: a body having a longitudinal axis; a plurality of locking bars that extend transverse to said longitudinal axis of said body; a spring; a ring; and, a cam;
said body includes a plurality of grooves, an exterior, and an internal longitudinal bore therethrough;
said plurality of grooves extend from said exterior of said body to said internal longitudinal bore;
said locking bars each having an intermediate portion movable in said groove and end portions at opposite ends of said intermediate portion;
said spring operable between said body and said ring;
said ring engages said plurality of locking bars; said cam slidingly engages said body;
said cam slidingly engages said end portions of said plurality of locking bars externally of said body;
said cam movable between first and second positions;
said cam in said first position permitting said ring, urged by said spring, to force said plurality of locking bars into said grooves of said body, each one of said plurality of locking bars extending into said internal longitudinal bore; and,
said cam in said second position urging said locking bars toward said exterior of said body and against said ring compressing said spring;
a male coupling half;
said male coupling half secured by said locking bars when said cam is in said first position.

13. A coupling as claimed in claim 12, further comprising:
a sleeve;
said sleeve slidingly engages said body and positions said cam in said second position against the force of said spring when desired to permit uncoupling said male coupling half and said female coupling half.

14. A coupling as claimed in claim 13 wherein said substantially square, in cross-section, intermediate portion of each of said locking bars includes an arcuate retaining surface.

15. A coupling as claimed in claim 14 wherein said substantially square, in cross-section, intermediate portion of each of said locking bars includes an engagement side; and said engagement side includes a first arcuate wall, a second arcuate wall, and an arcuate groove residing between said first arcuate wall and said second arcuate wall.

16. A coupling as claimed in claim 15, further comprising:
said engagement side includes a first face of said substantially square, in cross-section, intermediate portion;
said engagement side includes a second cut-away face of said substantially square, in cross-section, portion;
said first arcuate wall extends from said first face of said engagement side of said substantially square, in cross-section, intermediate portion;

said second arcuate wall extends from said second cut-away face of said engagement side of said substantially square, in cross-section, portion; and,
said arcuate retaining surface is formed in said second cut-away face of engagement side of said substantially square, in cross-section, portion.

17. A coupling as claimed in claim 12 wherein each said end portion of each locking bar is cylindrical said intermediate portion of each locking bar is substantially square, in cross-section.

18. A coupling as claimed in claim 12 wherein:
first one of the end portions of each locking bar includes a first cylindrical portion and a first end surface;
a second one of the end portions of each locking bar includes a second cylindrical portion and a second end surface;
said cam is generally cylindrically shaped and includes an inner surface; said cam includes a first post, a second post, and a third post;
each of said posts of said cam includes one locking bar end guide surface and another locking bar end guide surface;
said cam includes a first cam surface, a second cam surface and a third cam surface;
said first cam surface resides between said one locking bar end guide surface of said first post and said another locking bar end guide surface of said second post;
said second cam surface resides between said one locking bar end guide surface of said second post and said another locking bar end guide surface of said third post;
said third cam surface resides between said one locking bar end guide surface of said third post and said another locking bar end guide surface of said first post;
said inner surface of said cam is keyed to said body preventing rotation of said cam with respect to said body;
said first end surface of said first end of a first said locking bar is guided by said one locking bar first end guide surface of said first post of said cam, said second end surface of said second end of said first locking bar guided by said another locking bar end guide surface of said second post of said cam;
said first end surface of said first end of a second said locking bar is guided by said one locking bar first end guide surface of said second post of said cam, said second end surface of said second end of said second locking bar is guided by said another locking bar end guide surface of said third post of said cam;
said first end surface of said first end of a third said locking bar is guided by said one locking bar first end guide surface of said third post of said cam, said second end surface of said second end of said third locking bar guided by said another locking bar end guide surface of said first post of said cam;
said first cylindrical portion of said first locking bar and said second cylindrical portion of said first locking bar slidingly engages said first cam surface as said cam moves between said first position and said second position urging said locking bar toward said exterior of said body and out of said internal longitudinal bore of said body;
said first cylindrical portion of said second locking bar and said second cylindrical portion of said second locking bar slidingly engages said second cam surface as said cam moves between said first position and said second position urging said locking bar toward said exterior of said body and out of said internal longitudinal bore of said body; and, said first cylindrical portion of said third locking bar and said second cylindrical portion of said third locking bar slidingly engages said third cam surface as said cam moves between said first position and said second position urging said locking bar toward said exterior of said body and out of said internal longitudinal bore of said body.

19. A coupling as claimed in claim 12 wherein said ring and said cam are each made of metal or plastic.

20. A coupling as claimed in claim 12 wherein said male coupling half is push-to-connect.

21. A coupling as claimed in claim 12 wherein said locking bar is stainless steel.

22. A coupling as claimed in claim 12 wherein said locking bar is coated with a coating.

23. A coupling, comprising:
a female coupling half;
said female coupling half includes a body and a locking bar;
said locking bar includes a substantially square, in cross-section, intermediate portion;
said body of said female coupling half includes a groove, an exterior, and an internal longitudinal bore therethrough;
said groove extends from exterior of said body to said internal longitudinal bore;
said substantially square, in cross-section, intermediate portion of said locking bar resides in said groove of said body of said female coupling half; and
a male coupling half;
said substantially square, in cross-section, intermediate portion of said locking bar resides in said groove of said body of said female coupling half engaging said male coupling half when said coupling is fully coupled;
said male coupling half includes an external circumferentially extending groove, said external circumferentially extending groove includes a circumferentially extending mating surface extending to a radially outer edge of said groove;
said locking bar of said female half engages said circumferentially extending mating surface of said external circumferentially extending groove of said male coupling half at an engagement area that is radially inwardly spaced from said radially outer edge of said groove;
said substantially square, in cross-section, intermediate portion of said locking bar of said female coupling half includes an arcuate retaining surface;
said arcuate retaining surface of said substantially square, in cross-section, intermediate portion of said locking bar of said female half, engages said circumferentially extending mating surface of said external circumferentially extending groove of said male half at said engagement area; and,
said substantially square, in cross-section, intermediate portion of said locking bar of said female coupling half includes a second surface opposite said arcuate retaining surface; said second surface opposite said arcuate surface engages said groove of said body of said female coupling half locking said male coupling half and said female coupling half together.

24. A coupling as claimed in claim 23 wherein said groove of said body is transversely oriented with respect to said internal longitudinal bore and wherein said locking bar is transversely oriented with respect to said internal longitudinal bore and said male coupling half.

25. A coupling as claimed in claim 23 wherein:
said locking bar of said female coupling half includes a first cylindrical end and a second cylindrical end, said substantially square, in cross-section, intermediate portion resides between said first and second ends;
said substantially square, in cross-section, intermediate portion of said locking bar of said female half includes a first arcuate wall, a second arcuate wall, and an arcuate groove;
said arcuate groove resides between said first arcuate wall and said second arcuate wall; and,
said arcuate groove of said substantially square, in cross-section, intermediate portion of said locking bar of said female half spaced apart from said male coupling half during coupling.

26. A coupling as claimed in claim 25, further comprising:
an engagement side of said substantially square, in cross-section, intermediate portion includes a first face;
said engagement side of said substantially square, in cross-section, intermediate portion includes a second face;
said first arcuate wall extends from said first face of said engagement side of said substantially square, in cross-section, intermediate portion;
said second arcuate wall extends from said second face of said engagement side of said substantially square, in cross-section, intermediate portion; and,
said arcuate retaining surface resides in said second face of said engagement side of said substantially square, in cross-section, intermediate portion.

27. A coupling as claimed in claim 23, further comprising:
said female coupling half includes: a spring; a locking ring; and, a cam; spring operable between said body and said locking ring;
said ring engages said locking bar; said cam slidingly engages said body;
said cam slidingly engages said locking bar;
said cam movable between first and second positions;
said cam in said first position permitting said ring, urged by said spring, to force said locking bar into said groove of said body extending said locking bar into said internal longitudinal bore of said body; and, said cam in said second position urging said locking bar toward said exterior of said body and out of said internal longitudinal bore against said ring compressing said spring.

28. A coupling as claimed in claim 27, further comprising:
a sleeve;
said sleeve slidingly engages said body and positions said cam in said second position against the force of said spring when desired to permit uncoupling said male coupling half and said female coupling half.

29. A coupling as claimed in claim 27 wherein said coupling is a push-to-connect coupling.

30. A female coupling half, comprising:
a body having a longitudinal axis and a locking bar that extends transverse to said longitudinal axis of said body;
said locking bar includes a substantially square, in cross-section, intermediate portion between opposite end portions;
said body of said female coupling half includes a groove, an exterior, and an internal longitudinal bore therethrough;
said groove extends from said exterior of said body to said internal longitudinal bore, and the groove is defined by longitudinally spaced-apart surfaces that are inclined to the longitudinal axis of the body and to a plane perpendicular to the longitudinal axis of the body;

said substantially square, in cross-section, intermediate portion of said locking bar resides in said groove of said body of said female coupling half; and said opposite end portions extend transversely outwardly beyond said exterior of said body.

31. A female coupling half as claimed in claim 30 wherein said substantially square, in cross-section, intermediate portion of said locking bar includes an arcuate retaining surface.

32. A female coupling half as claimed in claim 30 wherein said substantially square, in cross-section, intermediate portion of said locking bar includes a first arcuate wall, a second arcuate wall, and an arcuate groove residing between said first arcuate wall and said second arcuate wall.

33. A female coupling half as claimed in claim 32, further comprising:
  a first face of said substantially square, in cross-section, intermediate portion;
  a second face of said substantially square, in cross-section, intermediate portion;
  said first arcuate wall extends from said first face of said substantially square, in cross-section, intermediate portion;
  said second arcuate wall extends from said second face of said substantially square, in cross-section, intermediate portion; and,
  said arcuate retaining surface formed in said second face of said substantially square, in cross-section, intermediate portion.

34. A female coupling half, comprising:
  a body having a longitudinal axis and a locking bar that extends transverse to said longitudinal axis of said body;
  said locking bar includes a substantially square, in cross-section, intermediate portion between opposite end portions;
  said body of said female coupling half includes a groove, an exterior, and an internal longitudinal bore therethrough;
  said groove extends from said exterior of said body to said internal longitudinal bore;
  said substantially square, in cross-section, intermediate portion of said locking bar resides in said groove of said body of said female coupling half;
  said opposite end portions extend transversely outwardly beyond said exterior of said body; and
  further comprising:
  a spring; a locking ring; and, a cam;
  spring operable between said body and said locking ring;
  said ring engages said locking bar;
  said cam slidingly engages said body;
  said cam slidingly engages said end portions of said locking bar;
  said cam movable between first and second positions; and,
  said cam in said first position permitting said ring, urged by said spring, to force said locking bar into said groove of said body extending said locking bar into said internal longitudinal bore of said body; and, said cam in said second position urging said locking bar toward said exterior of said body and out of said internal longitudinal bore against said ring compressing said spring.

35. A female coupling half as claimed in claim 34, further comprising:
  a sleeve;
  said sleeve slidingly engages said body and positions said cam in said second position against the force of said spring when desired to retract said locking bar from said internal longitudinal bore of said body.

36. A female coupling half as claimed in claim 34 wherein each end portion is cylindrical.

37. A coupling, comprising:
  a female coupling half and a male coupling half;
  said female coupling half includes a body and a plurality of locking bars;
  each of said plurality of locking bars includes a substantially square, in cross-section, intermediate portion;
  said body of said female coupling half includes a plurality of grooves therein for each respective locking bar;
  said body also includes an exterior and an internal longitudinal bore therethrough;
  each of said grooves extends from said exterior of said body to said internal longitudinal bore;
  each of said substantially square, in cross-section, intermediate portions of each of said plurality of locking bars resides in one of said grooves of said body of said female coupling half;
  each of said substantially square, in cross-section, intermediate portions of each of said plurality of locking bars oriented in said grooves of said body of said female coupling half engage said male coupling half when said coupling is fully coupled;
  each of said substantially square, in cross-section, intermediate portions of said locking bars of said female coupling half includes an arcuate retaining surface;
  said male coupling half includes an external circumferentially extending groove, said external circumferentially extending groove includes a circumferentially extending mating surface extending inwardly from a radially outer edge of said groove;
  each of said arcuate retaining surfaces of said substantially square, in cross-section, intermediate portions of said locking bars of said female half, engage said circumferentially extending mating surface of said external circumferentially extending groove of said male coupling half at an engagement area that is radially inwardly spaced from said radially outer edge of said groove.

38. A coupling as claimed in claim 37 wherein:
  each of said substantially square, in cross-section, intermediate portions of said locking bars of said female coupling half includes a second surface opposite said arcuate retaining surface; and,
  each of said second surfaces opposite said arcuate surfaces of each of said intermediate portions engage said groove of said body of said female coupling half locking said male coupling half and said female coupling half together.

39. A coupling as claimed in claim 37 wherein:
  each of said locking bars of each of said female coupling halves includes a first cylindrical end, a second cylindrical end, and, a substantially square, in cross-section, intermediate portion, and, said each of said substantially square, in cross-section, intermediate portions, resides between said first and second cylindrical ends;
  each of said substantially square, in cross-section, intermediate portions of said locking bars of said female halves includes an a first arcuate wall, a second arcuate wall, and an arcuate groove;
  each of said arcuate grooves resides between a respective said first arcuate wall and a respective said second arcuate wall; and,
  each said arcuate groove is spaced apart from said male coupling half during coupling.

40. A coupling as claimed in claim 39, further comprising:
  an engagement side of each of said substantially square, in cross-section, intermediate portions includes a first face;

said engagement side of said substantially square, in cross-section, intermediate portions includes a second face;

each said first arcuate wall extends from said first face of said engagement side of said substantially square, in cross-section, intermediate portions;

each of said second arcuate walls extend from said second face of each of said respective engagement sides of said substantially square, in cross-section, intermediate portions; and, each of said arcuate retaining surfaces resides in said second face of a respective said engagement side of said substantially square, in cross-section, intermediate portion.

41. A coupling as claimed in claim 37, further comprising: said female coupling half includes: a spring; a locking ring; and, a cam;

said spring is operable between said body and said locking ring;

said ring engages said plurality of said locking bars;

said cam slidingly engages said body;

said cam slidingly engages each of said plurality locking bars;

said cam movable between first and second positions;

said cam in said first position permitting said ring, urged by said spring, to force each of said plurality locking bars into respective ones of said plurality of grooves of said body extending each of said plurality of locking bars into said internal longitudinal bore of said body; and, said cam in said second position urging each of said plurality of locking bars toward said exterior of said body and out of said internal longitudinal bore against said ring compressing said spring;

said male coupling half being secured by each of said plurality of locking bars when said cam is in said first position.

42. A coupling as claimed in claim 41, further comprising: a sleeve;

said sleeve slidingly engages said body and positions said cam in said second position against the force of said spring when desired to permit uncoupling said male coupling half and said female coupling half.

43. A coupling as claimed in claim 37 wherein said coupling is a push-to-connect coupling.

44. A coupling as claimed in claim 37 wherein said locking bar is stainless steel.

45. A coupling as claimed in claim 37 wherein said locking bar is coated with a coating.

46. A female coupling half, comprising:

a body and a plurality of locking bars;

each of said plurality of locking bars includes a substantially square, in cross-section, intermediate portion;

said body of said female coupling half includes a plurality of grooves, an exterior, and an internal longitudinal bore therethrough;

each of said plurality of grooves extends from said exterior of said body to said internal longitudinal bore;

each of said substantially square, in cross-section, intermediate portions of said locking bars resides in a respective one of said plurality of grooves of said body of said female coupling half;

a spring; a locking ring; and, a cam;

said spring operable between said body and said locking ring;

said locking ring engages each of said plurality of locking bars;

said cam slidingly engages said body;

said cam slidingly engages each of said plurality of locking bars externally of said body;

said cam movable between first and second positions; and, said cam in said first position permitting said locking ring, urged by said spring, to force each of said plurality of locking bars into said respective one of said plurality of grooves of said body extending said plurality of locking bars generally radially inwardly into said internal longitudinal bore of said body; and, said cam in said second position urging each of said plurality of locking bars generally radially outwardly toward said exterior of said body and out of said internal longitudinal bore against said locking ring compressing said spring.

47. A female coupling half as claimed in claim 46 wherein each of said plurality of grooves includes a stop.

48. A process for locking and unlocking a male coupling half and a female coupling half, said female coupling half includes: a body having a longitudinal axis, a spring-biased flow valve and a plurality of locking bars extending transverse to the longitudinal axis; each of said plurality of locking bars includes a substantially square, in cross-section, intermediate portion and end portions protruding from said body; said body of said female coupling half includes a plurality of grooves, an exterior, and an internal longitudinal bore therethrough; each of said plurality of grooves extends from said exterior of said body to said internal longitudinal bore; and, each of said substantially square, in cross-section, intermediate portions of said locking bars resides in a respective one of said plurality of grooves of said body of said female coupling half; a spring; a locking ring; and, a cam; said spring operable between said body and said locking ring biasing said locking ring; said locking ring engages each of said plurality of locking bars; said male coupling half includes: a male body and a circumferential recess, said circumferential recess includes a locking surface; comprising the steps of:

inserting said male body of said male coupling half into said body of said female coupling half, pushing said substantially square, in cross-section, intermediate portions of said locking bars, outwardly from a first position partially in said internal longitudinal bore to a second position toward said exterior of said body in said grooves against said spring-biased locking ring and moving said spring-biased locking ring from a first position to a second position;

pushing said male body of said male coupling half against the force of said spring-biased flow valve of said female coupling half, and sliding said male body of said male coupling half into said female coupling half until said substantially square, in cross-section, intermediate portions of said locking bars move from said second position to said first position and said locking surface of said circumferential recess of said male body resides in engagement with said substantially square, in cross-section, intermediate portions of said locking bars of said female coupling half locking said male coupling half and said female coupling half together and moving said cam to a first position and moving said spring-biased locking ring from said second position to said first position;

moving said cam to a second position under the influence of an external force and camming said end portions of said locking bars outwardly to move said locking bars outwardly in said grooves to said second position toward said exterior of said body of said female coupling half and moving said spring-biased locking ring to said second position;

extracting said male coupling half out of said body of said female coupling half under the influence of said spring-biased flow valve;

releasing said external force applied to said cam and moving said cam to said first position, moving said spring-biased locking ring to said first position and moving said locking bars to said first position unlocking and separating said male coupling half and said female coupling half.

* * * * *